United States Patent
Hazarika et al.

(10) Patent No.: US 12,452,652 B2
(45) Date of Patent: *Oct. 21, 2025

(54) MULTIPLE BASIC SERVICE SET IDENTIFIER (BSSID) BEACON BROADCAST

(71) Applicant: QUALCOMM Incorporated, San Diego, CA (US)

(72) Inventors: Gyanranjan Hazarika, Milpitas, CA (US); Viren Umrigar, Dublin, CA (US); Vinod Nagarajan, Saratoga, CA (US); Dinesh Upadhyay, San Jose, CA (US); Krishnakumar Muthusamy, Danville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,873

(22) Filed: Oct. 5, 2023

(65) Prior Publication Data

US 2024/0040372 A1  Feb. 1, 2024

Related U.S. Application Data

(63) Continuation of application No. 17/344,381, filed on Jun. 10, 2021, now Pat. No. 11,818,798.

(51) Int. Cl.
*H04W 8/28* (2009.01)
*H04W 76/11* (2018.01)
*H04W 84/12* (2009.01)

(52) U.S. Cl.
CPC .............. *H04W 8/28* (2013.01); *H04W 76/11* (2018.02); *H04W 84/12* (2013.01)

(58) Field of Classification Search
CPC ........ H04W 8/28; H04W 76/11; H04W 84/12
See application file for complete search history.

(56) References Cited

U.S. PATENT DOCUMENTS

| | | |
|---|---|---|
| 10,212,730 B1 | 2/2019 | Chu et al. |
| 10,237,891 B1 | 3/2019 | Chu et al. |

(Continued)

FOREIGN PATENT DOCUMENTS

| | | |
|---|---|---|
| CN | 111758292 A | 10/2020 |
| WO | WO-2018067261 A1 | 4/2018 |

(Continued)

OTHER PUBLICATIONS

"IEEE Standard for Information Technology—Telecommunications and Information Exchange between Systems Local and Metropolitan Area Networks—Specific Requirements Part 11: WLAN MAC and PHY Specifications Amendment 1: Enhancements for High-Efficiency WLAN", IEEE Standard, IEEE, Piscataway, NJ, USA, May 19, 2021, pp. 1-767, XP068181575, Paragraphs 9 . 4 . 2.45 to 9.4.2.62, 11.1.3.8 . 1 to 11.1.3.8.5.

(Continued)

*Primary Examiner* — Jamal Javaid
(74) *Attorney, Agent, or Firm* — Holland & Hart LLP

(57) ABSTRACT

This disclosure provides methods, devices and systems for establishing and maintaining connectivity between access points (APs) that provide multiple BSSID sets and wireless stations (STAs) that do not support enhanced multiple BSSID advertisement (EMA). In some implementations, a wireless communication device may transmit a burst of beacon frames each carrying a respective partial list of nontransmitted BSSID profiles for a multiple BSSID set. In such implementations, the bursts of beacon frames may be transmitted periodically such that the start of each burst occurs one beacon interval after the start of a prior burst. In some other implementations, a wireless communication device may broadcast multiple beacon frames each carrying a full set of nontransmitted BSSID profiles associated with a respective multiple BSSID set. In such implementations, (Continued)

each beacon frame may be periodically broadcast every beacon interval.

30 Claims, 15 Drawing Sheets

(56) References Cited

U.S. PATENT DOCUMENTS

| | | | |
|---|---|---|---|
| 11,259,285 | B2 | 2/2022 | Gidvani et al. |
| 11,818,798 | B2 * | 11/2023 | Hazarika ............... H04W 76/11 |
| 2007/0195727 | A1 | 8/2007 | Kinder et al. |
| 2018/0041917 | A1 | 2/2018 | Xi et al. |
| 2018/0302922 | A1 | 10/2018 | Patil et al. |
| 2019/0200171 | A1 | 6/2019 | Huang et al. |
| 2019/0268825 | A1 | 8/2019 | Patil et al. |
| 2019/0297632 | A1 * | 9/2019 | Huang .................. H04W 84/12 |
| 2020/0112910 | A1 | 4/2020 | Cherian et al. |
| 2020/0137550 | A1 | 4/2020 | Patil et al. |
| 2020/0187091 | A1 | 6/2020 | Ko et al. |
| 2022/0400374 | A1 | 12/2022 | Hazarika et al. |

FOREIGN PATENT DOCUMENTS

| | | |
|---|---|---|
| WO | WO-2019168609 A1 | 9/2019 |
| WO | WO-2020139002 A1 | 7/2020 |

OTHER PUBLICATIONS

International Search Report and Written Opinion—PCT/US2022/032105—ISA/EPO—Aug. 11, 2022.
European Search Report—EP24197460—Search Authority—MUNICH—Oct. 30, 2024.
Taiwan Search Report—TW111120838—TIPO—Jul. 15, 2025.

* cited by examiner

MULTIPLE BASIC SERVICE SET IDENTIFIER (BSSID) BEACON BROADCAST

CROSS REFERENCE

The present application for patent is a Continuation of U.S. patent application Ser. No. 17/344,381 by HAZARIKA et al., entitled "MULTIPLE BASIC SERVICE SET IDENTIFIER (BSSID) BEACON BROADCAST" filed Jun. 10, 2021, assigned to the assignee hereof, and expressly incorporated by reference in its entirety herein.

TECHNICAL FIELD

This disclosure relates generally to wireless communication, and more specifically to duplicate transmissions with channel puncturing.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A multiple BSSID set is a collection of APs that share a common operating class, channel, receive antenna connector, and transmit antenna connector. One of the APs in a multiple BSSID set corresponds to a transmitted BSSID while the remaining APs in the multiple BSSID set correspond to nontransmitted BSSIDs. The AP corresponding to the transmitted BSSID advertises information for multiple BSSIDs, including the transmitted BSSID and one or more nontransmitted BSSIDs, using beacon or probe response frames. For example, each beacon and probe response frame may include one or more multiple BSSID elements advertising one or more nontransmitted BSSID profiles. Each nontransmitted BSSID profile includes BSSID information that can be used to establish or maintain communications with a respective nontransmitted BSSID.

An enhanced multiple BSSID advertisement (EMA) AP can advertise a partial list of nontransmitted BSSID profiles in each beacon or probe response frame. As such, an EMA AP may distribute a full set of nontransmitted BSSID profiles across multiple beacon or probe response frames. For example, if a multiple BSSID set includes 7 BSSIDs (such as 1 transmitted BSSID and 6 nontransmitted BSSIDs), an EMA AP may broadcast a first beacon frame carrying 3 nontransmitted BSSID profiles at a first target beacon transmission time (TBTT) and may subsequently broadcast a second beacon frame carrying the remaining 3 nontransmitted BSSID profiles at a second TBTT. As a result, a STA must wait at least 2 TBTTs to receive a full set of (6) nontransmitted BSSID profiles for the multiple BSSID set.

The IEEE 802.11ax amendment of the IEEE 802.11 standard provides support for EMA features. However, the Wi-Fi Alliance (WFA) does not require STAs conforming to the IEEE 802.11ax amendment to support EMA. As result, some STAs may be capable of associating with a nontransmitted BSSID of a multiple BSSID set but may not be able to properly interpret the beacon or probe response frames transmitted by an EMA AP. More specifically, a STA that does not support EMA (also referred to as a "non-EMA STA") may not know that it is receiving only a partial list of nontransmitted BSSID profiles in each beacon frame broadcast by an EMA AP (at each TBTT), which may cause interoperability issues between EMA APs and non-EMA STAs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include broadcasting a first beacon frame that carries basic service set identifier (BSSID) information associated with one or more first nontransmitted BSSIDs of a multiple BSSID set; and broadcasting a second beacon frame that carries BSSID information associated with one or more second nontransmitted BSSIDs of the multiple BSSID set that are different than the one or more first nontransmitted BSSIDs, where the second beacon frame is broadcast less than a beacon interval after the first beacon frame. In some implementations, the first and second beacon frames may be broadcast as a burst transmission.

In some implementations, the first beacon frame may include a respective transmitter address indicating a transmitted BSSID of the multiple BSSID set and the second beacon frame may include a respective transmitter address indicating the transmitted BSSID of the multiple BSSID set. In some implementations, each of the first and second beacon frames may include a respective multiple BSSID configuration element having a full set receive periodicity (FSRP) field that is set to a value greater than 1. In some implementations, the FSRP field of the first beacon frame may be set to the same value as the FSRP field of the second beacon frame.

In some aspects, the method may further include broadcasting a third beacon frame that carries the BSSID information associated with the one or more first nontransmitted BSSIDs, where the third beacon frame is broadcast one beacon interval after the first beacon frame; and broadcasting a fourth beacon frame that carries the BSSID information associated with the one or more second nontransmitted BSSIDs, where the fourth beacon frame is broadcast one beacon interval after the second beacon frame.

In some implementations, the third beacon frame may include a respective transmitter address indicating the transmitted BSSID of the multiple BSSID set and the fourth beacon frame may include a respective transmitter address indicating the transmitted BSSID of the multiple BSSID set. In some implementations, each of the third and fourth beacon frames may include a respective multiple BSSID configuration element having an FSRP field that is set to a value greater than 1. In some implementations, the FSRP fields of the first, second, third, and fourth beacon frames may be set to the same value.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including broadcasting a first beacon frame that carries BSSID information associated with one or more first nontransmitted BSSIDs of a multiple BSSID set; and broadcasting a second beacon frame that carries BSSID information associated with one or more second nontransmitted BSSIDs of the multiple BSSID set that are different than the one or more first nontransmitted BSSIDs, where the second beacon frame is broadcast less than a beacon interval after the first beacon frame.

Another innovative aspect of the subject matter described in this disclosure can be implemented as a method of wireless communication. The method may be performed by a wireless communication device, and may include broadcasting a first beacon frame that carries BSSID information associated with one or more nontransmitted BSSIDs of a first multiple BSSID set; and broadcasting a second beacon frame that carries BSSID information associated with one or more nontransmitted BSSIDs of a second multiple BSSID set that is different than the first multiple BSSID set. In some implementations, the first beacon frame may include a respective transmitter address indicating a transmitted BSSID of the first multiple BSSID set and the second beacon frame may include a respective transmitter address indicating a transmitted BSSID of the second multiple BSSID set.

In some implementations, each of the first and second beacon frames may include a respective multiple BSSID configuration element having an FSRP field that is set to a value equal to 1. In some other implementations, the first beacon frame may include a respective multiple BSSID configuration element having an FSRP field that is set to a first value and the second beacon frame may include a respective multiple BSSID configuration element having an FSRP field that is set to a second value.

In some implementations, BSSIDs in the first multiple BSSID set may span a first range of values in an ordered sequence of values and BSSIDs in the second multiple BSSID set may span a second range of values in the ordered sequence that does not overlap the first range. In some implementations, the first beacon frame may include one or more multiple BSSID elements each having a respective maximum BSSID indicator field that is set to a value (n), where the first 48-n bits of each BSSID in the first multiple BSSID set are the same as the first 48-n bits of each BSSID in the second multiple BSSID set. In some implementations, each of the first and second multiple BSSID elements may include a respective maximum BSSID indicator field that is set to a value (n) based on a number (N) of BSSIDs in the first multiple BSSID set and a number (M) of BSSIDs in the second multiple BSSID set, for example, where $2^n \geq N+M$.

In some aspects, the method may further include broadcasting a third beacon frame that carries the BSSID information associated with the one or more nontransmitted BSSIDs of the first multiple BSSID set, where the third beacon frame is broadcast one beacon interval after the first beacon frame; and broadcasting a fourth beacon frame that carries the BSSID information associated with the one or more nontransmitted BSSIDs of the second multiple BSSID set, where the fourth beacon frame is broadcast one beacon interval after the second beacon frame.

In some aspects, the method may further include broadcasting a third beacon frame that carries BSSID information associated with one or more nontransmitted BSSIDs of the first multiple BSSID set that are different than the nontransmitted BSSIDs associated with the BSSID information carried in the first beacon frame, where the third beacon frame is broadcast less than a beacon interval after the first beacon frame. In some implementations, the first and third beacon frames may be broadcast as a burst transmission. In some aspects, the method may further include broadcasting a fourth beacon frame that carries BSSID information associated with one or more nontransmitted BSSIDs of the second multiple BSSID set that are different than the nontransmitted BSSIDs associated with the BSSID information carried in the second beacon frame, where the fourth beacon frame is broadcast less than a beacon interval after the second beacon frame.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including broadcasting a first beacon frame that carries BSSID information associated with one or more nontransmitted BSSIDs of a first multiple BSSID set; and broadcasting a second beacon frame that carries BSSID information associated with one or more nontransmitted BSSIDs of a second multiple BSSID set that is different than the first multiple BSSID set.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
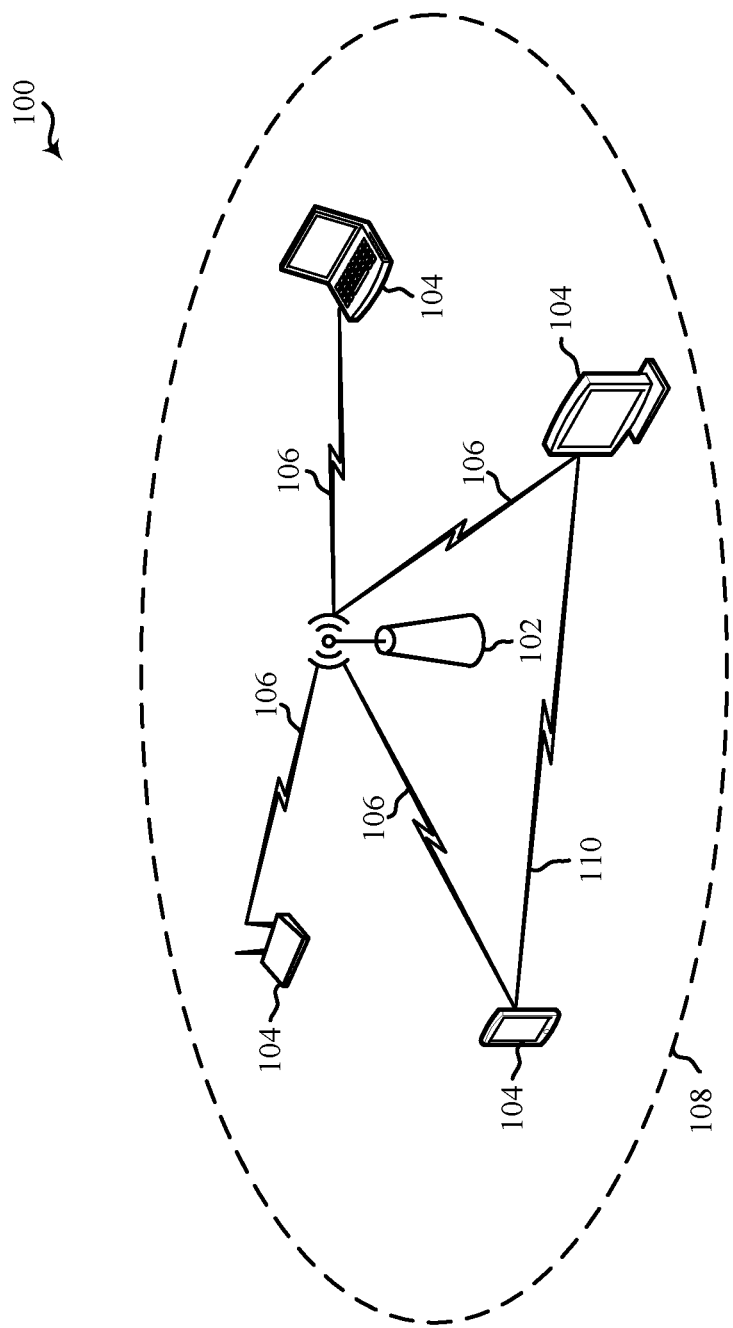
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to multiple basic service set identifier (BSSID) sets, and more particularly, to beacon frame broadcast techniques for establishing and maintaining connectivity between access points (APs) that provide multiple BSSID sets and wireless stations (STAs) that do not support enhanced multiple BSSID advertisement (EMA). In some implementations, a wireless communication device may transmit a burst of beacon frames each carrying a respective partial list of nontransmitted BSSID profiles for a multiple BSSID set. In such implementations, the bursts of beacon frames may be transmitted periodically such that the start of each burst occurs one beacon interval after the start of a prior burst. As a result, the partial list of nontransmitted BSSID profiles in each beacon frame may be advertised with a respective periodicity equal to one beacon interval. In some other implementations, a wireless communication device may broadcast multiple beacon frames each carrying a full set of nontransmitted BSSID profiles associated with a respective multiple BSSID set. In such implementations, each beacon frame may be periodically broadcast every beacon interval. As a result, the full set of nontransmitted BSSID profiles for each multiple BSSID set may be advertised with a periodicity equal to one beacon interval.

Particular implementations of the subject matter described in this disclosure can be implemented to realize one or more of the following potential advantages. Aspects of the present disclosure may ensure interoperability between EMA APs and STAs that do not support EMA (also referred to as "non-EMA STAs") by advertising each nontransmitted BSSID profile of a multiple BSSID set at a periodicity equal to one beacon interval. For example, during discovery, a non-EMA STA may receive a full set of nontransmitted BSSID profiles for a multiple BSSID set by listening to a burst of beacon frames broadcast by a wireless communication device for a multiple BSSID set (where each beacon frame carries a respective partial list of nontransmitted BSSID profiles for the multiple BSSID set) or by listening to one or more beacon frames broadcast by a wireless communication device for one or more multiple BSSID sets, respectively (where each beacon frame carries a full set of nontransmitted BSSID profiles for the multiple BSSID set). Because each nontransmitted BSSID profile is advertised at a periodicity equal to one beacon interval, a non-EMA STA may be less likely to lose its connection to a nontransmitted BSSID after association.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
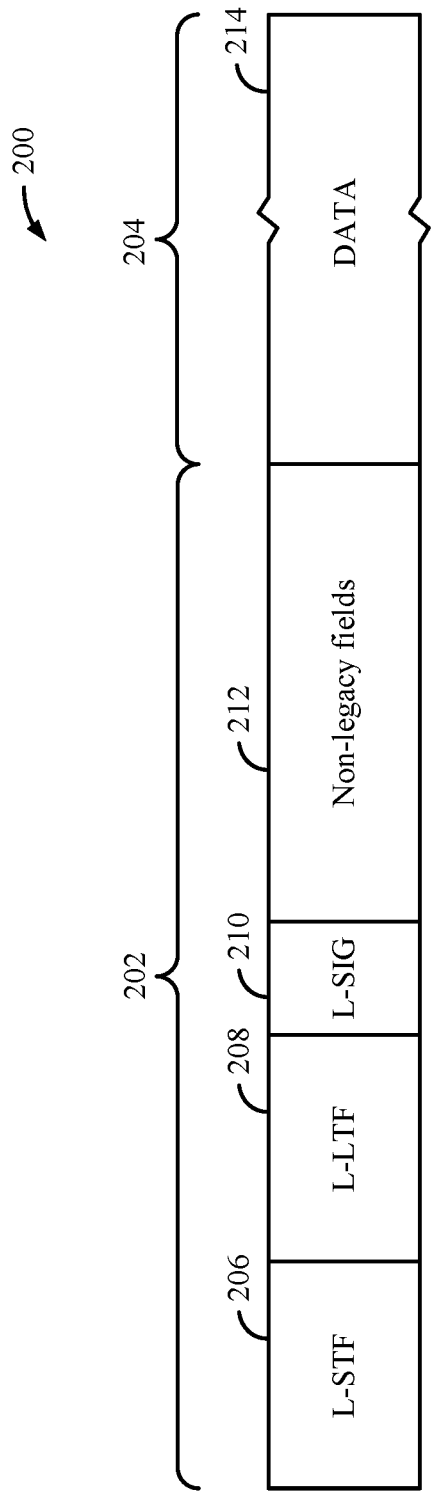
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
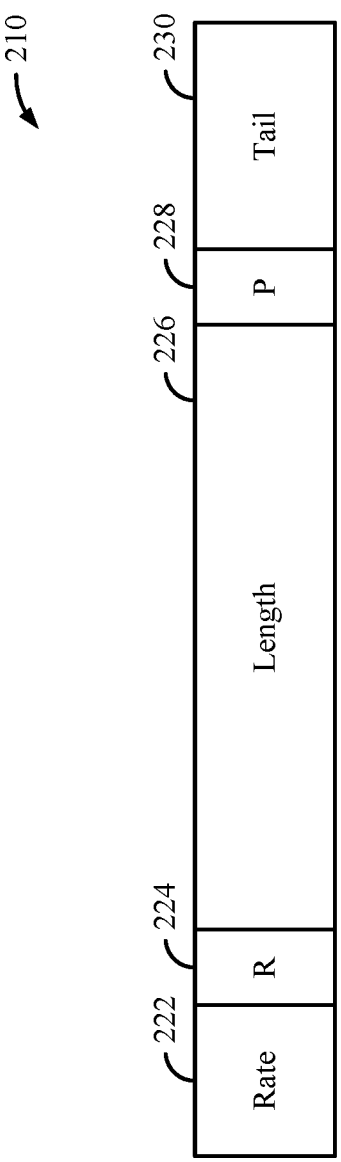
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
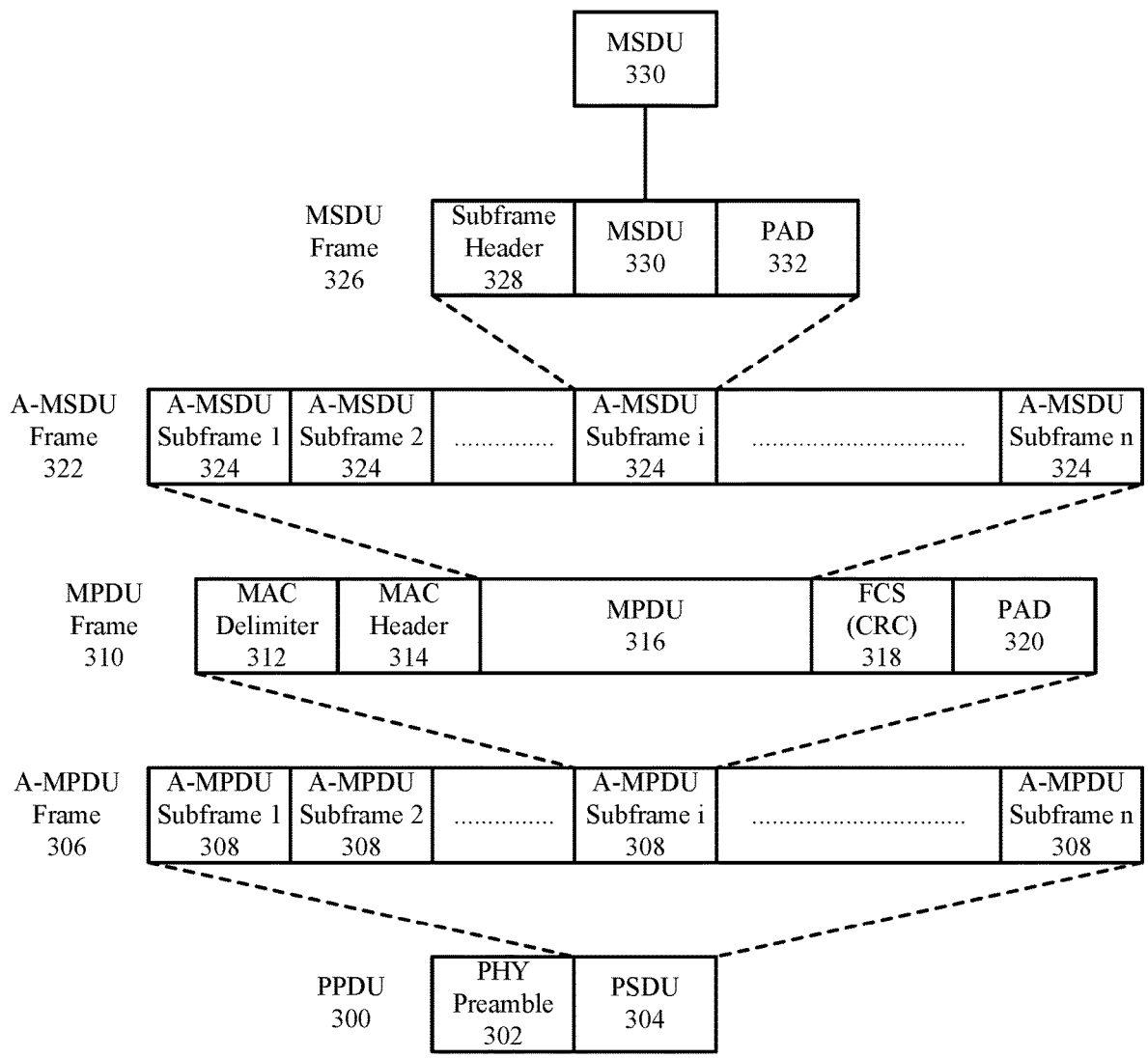
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
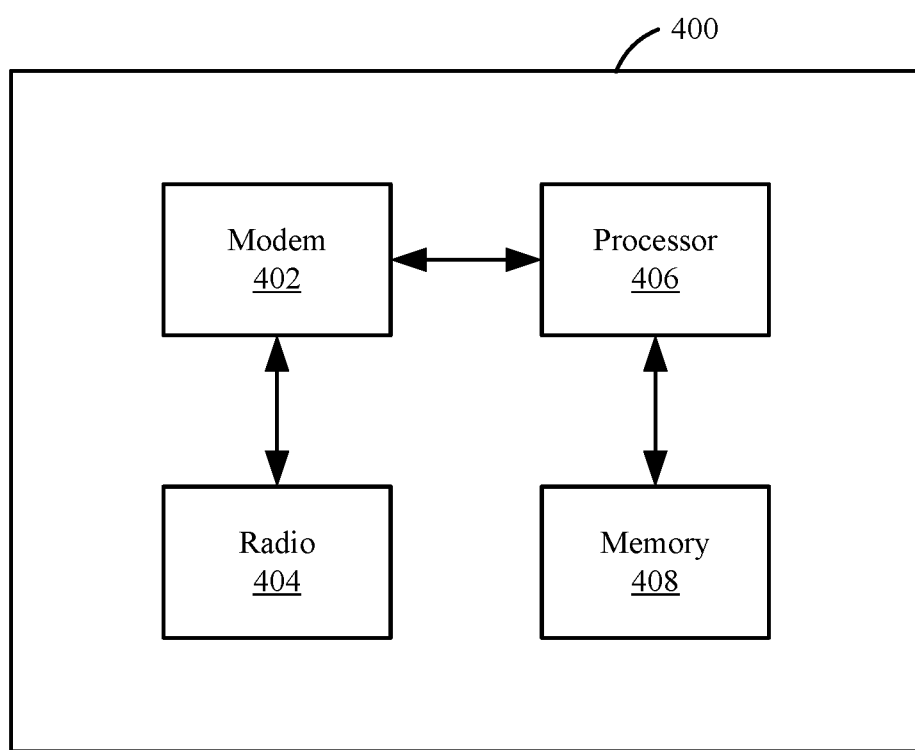
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
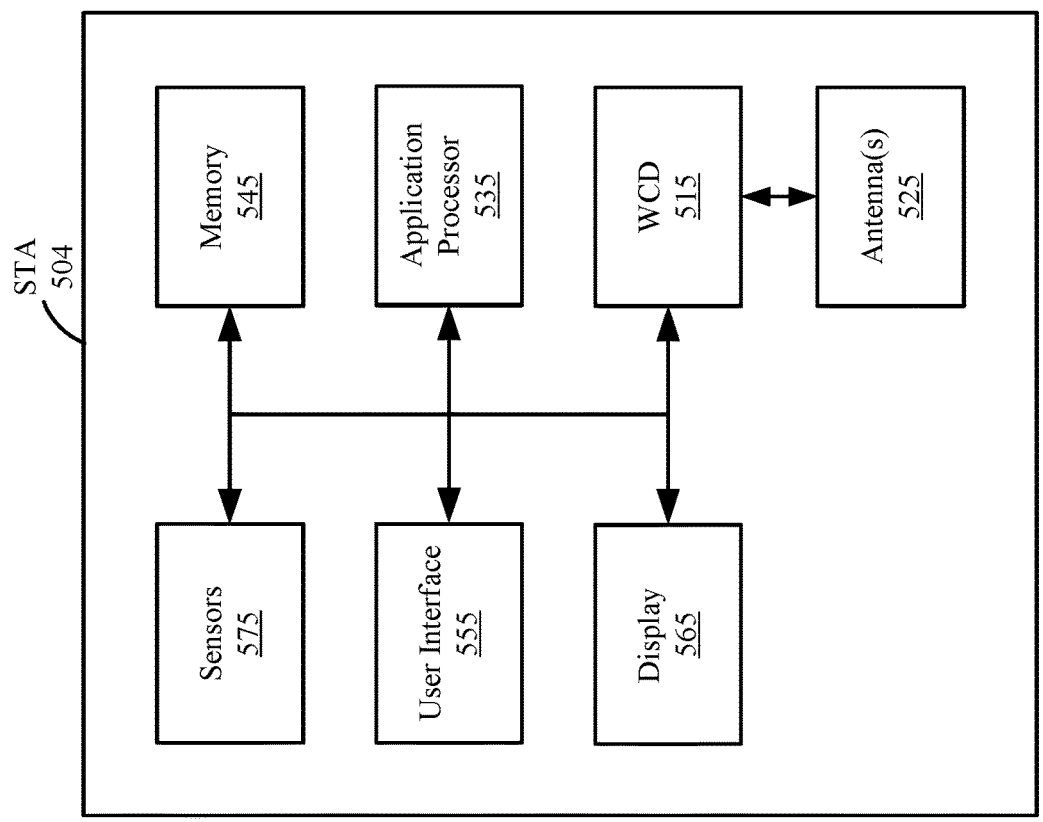
FIG. 5B shows a block diagram of an example STA.
Figure 5A:
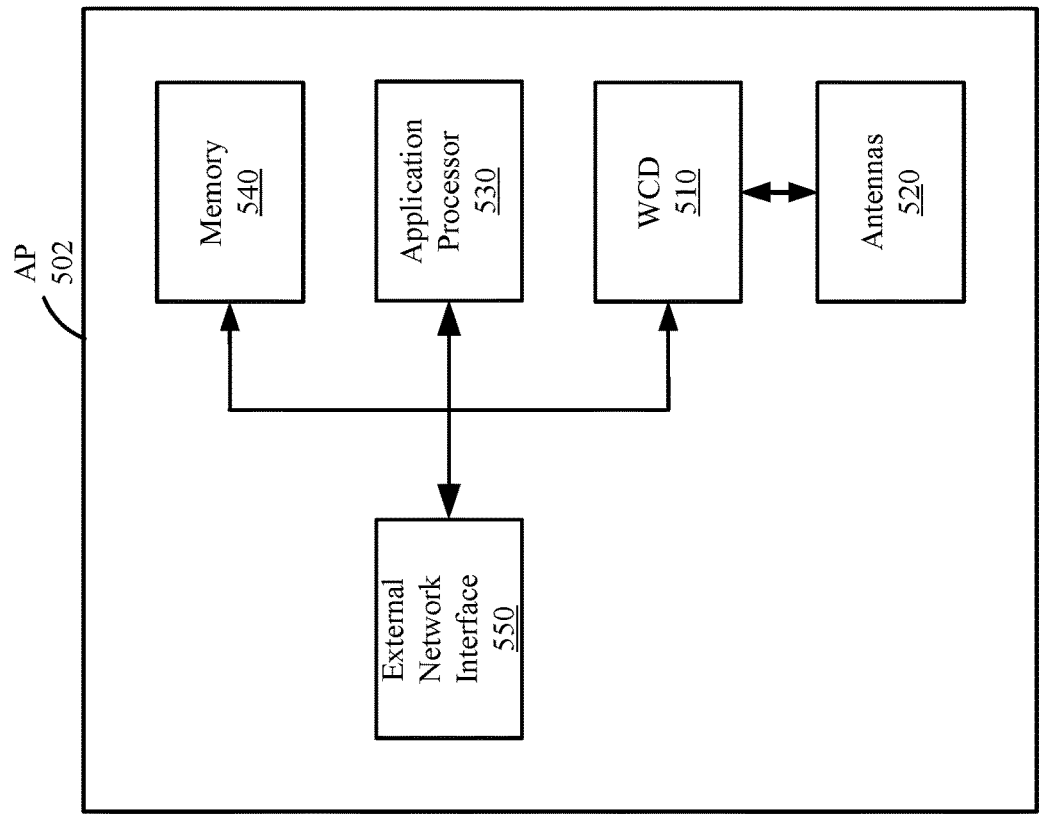
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
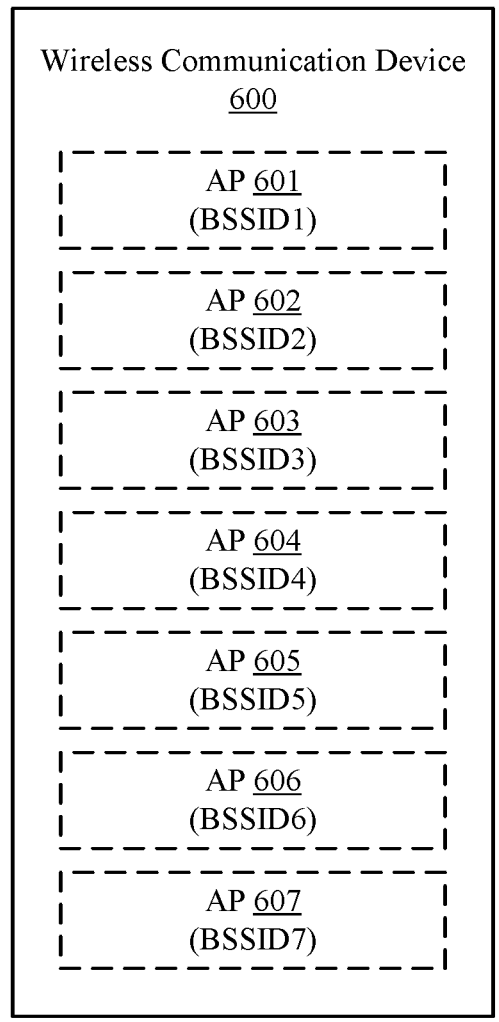
FIG. 6 shows an example wireless communication device configured to provide a multiple basic service set identifier (BSSID) set.

FIG. 6 shows an example wireless communication device 600 configured to provide a multiple BSSID set. A multiple BSSID set is a collection of APs (which also may be referred to as "virtual APs" or VAPs) that share a common operating class, channel, receive antenna connector, and transmit antenna connector. One of the APs in a multiple BSSID set corresponds to a transmitted BSSID while the remaining APs in the multiple BSSID set correspond to nontransmitted BSSIDs. The AP corresponding to the transmitted BSSID advertises information for each BSSID in the multiple BSSID set using beacon or probe response frames. In contrast, the APs corresponding to the nontransmitted BSSIDs do not transmit beacon or probe response frames.

In the example of FIG. 6, the multiple BSSID set includes 7 APs 601-607 each corresponding to a respective BSSID (BSSID1-BSSID7). In some implementations, BSSID1 may be the transmitted BSSID of the multiple BSSID set while BSSID2-BSSID7 may be nontransmitted BSSIDs of the multiple BSSID set. As such, the AP 601 advertises multiple BSSIDs (including BSSID1-BSSID7) in its beacon and probe response frames. For example, each beacon or probe response frame transmitted by the AP 601 carries BSSID information that can be used to establish or maintain communications with the transmitted BSSID (BSSID1). Each of the nontransmitted BSSIDs (BSSID2-BSSID7) may inherit at least some of the BSSID information associated with the transmitted BSSID. Additionally, each beacon or probe response frame may include one or more multiple BSSID elements carrying BSSID information that is specific to one or more of the nontransmitted BSSIDs. The BSSID information for each nontransmitted BSSID is carried in a respective nontransmitted BSSID profile subelement of a multiple BSSID element. Thus, the size of each beacon or probe response frame transmitted by the AP 601 may depend on the number of nontransmitted BSSID profiles included in the beacon or probe response frame.

Existing versions of the IEEE 802.11 standard do not define a maximum size for management frames. However, the IEEE 802.11ax amendment supports enhanced multiple BSSID advertisement (EMA) techniques that allow an AP corresponding to the transmitted BSSID of a multiple BSSID set (also referred to as an EMA AP) to advertise only a partial list of nontransmitted BSSID profiles in each beacon or probe response frame. As such, an EMA AP may distribute a full set of nontransmitted BSSID profiles across multiple beacon or probe response frames. With reference for example to FIG. 6, the AP 601 may, using EMA, broadcast a first beacon frame carrying a partial list of nontransmitted BSSID profiles associated with BSSID2-BSSID4 and subsequently broadcast a second beacon frame carrying a partial list of nontransmitted BSSID profiles associated with BSSID5-BSSID7. According to existing versions of the IEEE 802.11 standard, each of the first and second beacon frames may be broadcast at a respective TBTT. As such, a STA must wait at least 2 TBTTs (and receive at least two beacon frames broadcast by the AP 601) to receive a full set of nontransmitted BSSID profiles for BSSID2-BSSID7.

Figure 7:
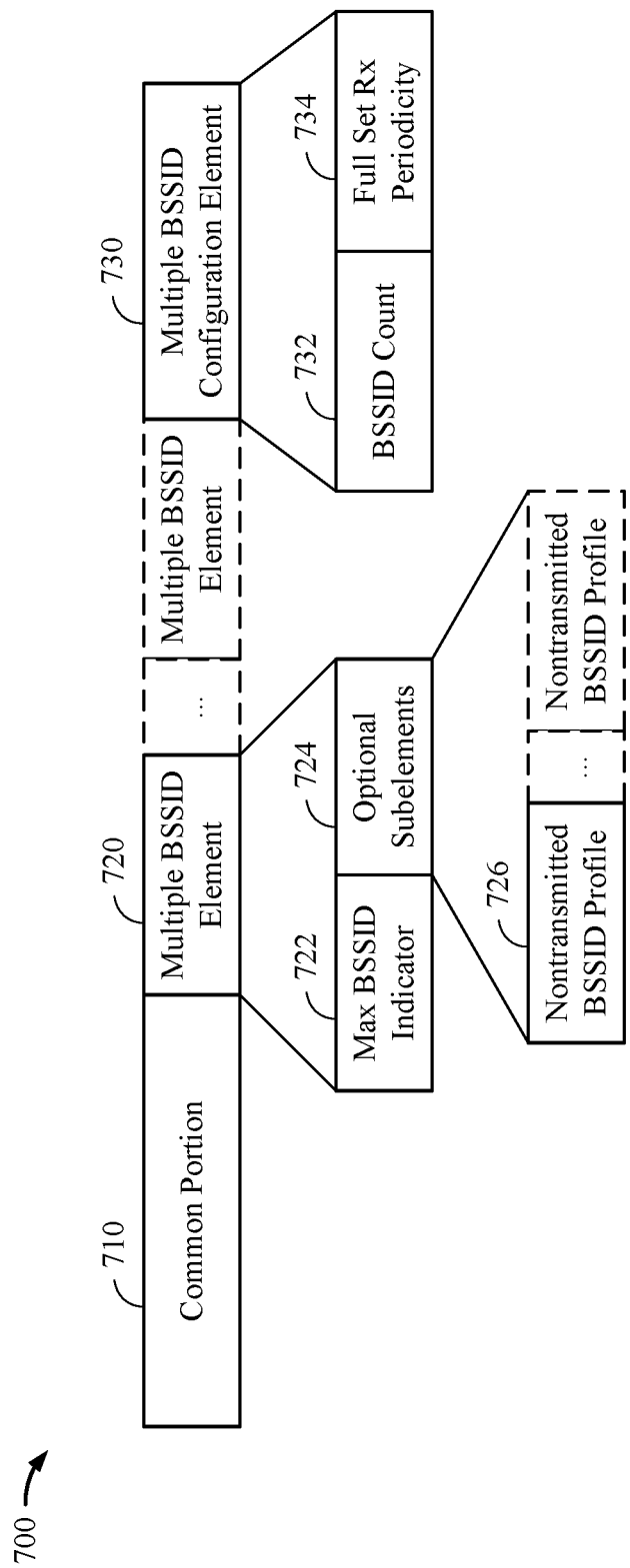
FIG. 7 shows an example beacon frame usable for communications between an AP and a number of STAs.

FIG. 7 shows an example beacon frame 700 usable for communications between an AP and a number of STAs. In some implementations, the beacon frame 700 may be used to advertise information for multiple BSSIDs of a multiple BSSID set. With reference for example to FIG. 6, the beacon frame 700 may be broadcast by the AP 601 to advertise information for the transmitted BSSID and one or more of the nontransmitted BSSIDs of the multiple BSSID set.

The beacon frame 700 includes a common portion 710, one or more multiple BSSID elements 720, and a multiple BSSID configuration element 730. The common portion 710 includes BSSID information that can be used to establish or maintain communications with the transmitted BSSID of the multiple BSSID set. For example, the common portion 710 may include a transmitter address (TA) field that is set to a value indicating the transmitted BSSID. At least some of the BSSID information in the common portion 710 may be shared or inherited by one or more nontransmitted BSSIDs of the multiple BSSID set. BSSID information that is specific to one or more nontransmitted BSSIDs (and not inherited from the common portion 710) may be carried in the multiple BSSID elements 720.

Each multiple BSSID element 720 includes a maximum (max) BSSID indicator field 722 and zero or more optional subelements 724. The max BSSID indicator field 722 is set to a value (n) that can be used to determine the maximum number of BSSIDs in the multiple BSSID set (where $2^n$ represents the maximum number of BSSIDs in the multiple BSSID set). Additionally, each nontransmitted BSSID of the multiple BSSID set can be determined based on the value of n and the transmitted BSSID of the multiple BSSID set. The optional subelements 724 may include one or more nontransmitted BSSID profile subelements 726. Each nontransmitted BSSID profile subelement 726 includes a list of elements for a respective nontransmitted BSSID of the multiple BSSID set. Example elements include at least a nontransmitted BSSID capability element, an SSID element, and a multiple BSSID-index element.

The multiple BSSID configuration element 730 includes a BSSID count field 732 and a full set receive periodicity (FSRP) field 734. The BSSID count field 732 carries information indicating the total number of active BSSIDs in the multiple BSSID set. The FSRP field 734 carries information indicating the minimum number of beacon frames a STA must receive (also referred to as an "FSRP value") in order to discover all of the active nontransmitted BSSIDs in the multiple BSSID set. For example, an FSRP value of 1 indicates that a STA need only receive a single beacon frame to discover all of the active nontransmitted BSSIDs of a multiple BSSID set. As such, each beacon frame advertises a full set of nontransmitted BSSID profiles for the multiple BSSID set. By contrast, an FSRP value of 3 indicates that a STA must receive at least 3 beacon frames to discover all of the active nontransmitted BSSIDs of a multiple BSSID set. As such, each beacon frame advertises a partial list of nontransmitted BSSID profiles for the multiple BSSID set.

Figure 8:
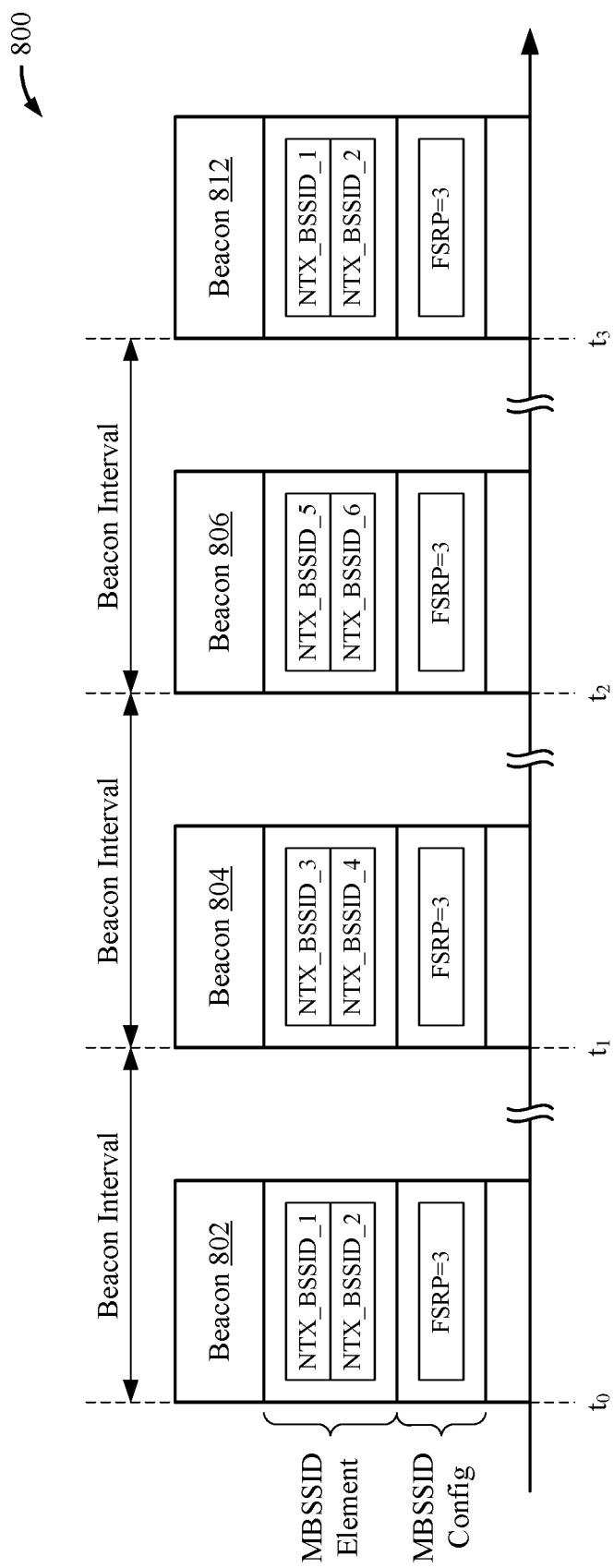
FIG. 8 shows a timing diagram depicting an example sequence of beacon frames advertising multiple BSSIDs in accordance with an enhanced multiple BSSID advertisement (EMA) procedure.

FIG. 8 shows a timing diagram 800 depicting an example sequence of beacon frames 802-812 advertising multiple BSSIDs in accordance with an EMA procedure. More specifically, the beacon frames 802-812 may be broadcast by an AP corresponding to the transmitted BSSID of a multiple BSSID set in accordance with existing versions (such as the IEEE 802.11ax amendment) of the IEEE 802.11 standard. In the example of FIG. 8, the multiple BSSID set includes 6 nontransmitted BSSIDs (NTX_BSSID_1-NTX_BSSID_6). With reference for example to FIG. 6, the transmitted BSSID of the multiple BSSID set may be one example of BSSID1 and NTX_BSSID_1-NTX_BSSID_6 may be examples of BSSID2-BSSID7, respectively. Each of the beacon frames 802-812 includes a multiple BSSID (MBSSID) element and a multiple BSSID (MBSSID) configuration element.

At time $t_0$, the AP broadcasts the beacon frame 802 to advertise a partial list of nontransmitted BSSID profiles for the multiple BSSID set. For example, the multiple BSSID element of the beacon frame 802 is shown to include nontransmitted BSSID profile subelements for NTX_BSSID_1 and NTX_BSSID_2. At time $t_1$, the AP broadcasts the beacon frame 804 to advertise another partial list of nontransmitted BSSID profiles for the multiple BSSID set. For example, the multiple BSSID element of the beacon frame 804 is shown to include nontransmitted BSSID profile subelements for NTX_BSSID_3 and NTX_BSSID_4. At time $t_2$, the AP broadcasts the beacon frame 806 to advertise another partial list of nontransmitted BSSID profiles for the multiple BSSID set. For example, the multiple BSSID element of the beacon frame 806 is shown to include nontransmitted BSSID profile subelements for NTX_BSSID_3 and NTX_BSSID_4. At time $t_3$, the AP broadcasts the beacon frame 812 to advertise the partial list of nontransmitted BSSID profiles previously advertised in the beacon frame 802.

In the example of FIG. 8, each of the beacon frames 802-812 is shown to include one multiple BSSID element with two nontransmitted multiple BSSID profile subelements (each carrying BSSID information for a respective nontransmitted BSSID of the multiple BSSID set). As such, the nontransmitted BSSID profiles of the multiple BSSID set are distributed across a total of three successive beacon frames (such as from times $t_0$ to $t_2$). The multiple BSSID configuration element in each of the beacon frames 802-812 therefore carries an FSRP value equal to 3. However, in actual implementations, each of the beacon frames 802-812 may include any number of multiple BSSID elements with any number of nontransmitted BSSID profile subelements.

As described above, the IEEE 802.11ax amendment of the IEEE 802.11 standard provides support for EMA features. However, the Wi-Fi Alliance (WFA) does not require STAs conforming to the IEEE 802.11ax amendment to support EMA. As result, some STAs may be capable of associating with a nontransmitted BSSID of a multiple BSSID set but may not be able to properly interpret the beacon or probe response frames transmitted by an EMA AP. More specifically, a STA that does not support EMA (also referred to as a "non-EMA STA") may not interpret the multiple BSSID configuration element in beacon frames broadcast by an EMA AP. As such, a non-EMA STA may not know that it is receiving only a partial list of nontransmitted BSSID profiles in each beacon frame broadcast by the EMA AP, which may cause interoperability issues between EMA APs and non-EMA STAs.

With reference for example to FIG. 8, a non-EMA STA may receive only the beacon frame 804 during discovery. However, because the non-EMA STA may not interpret the multiple BSSID configuration element in the beacon frame 804, the non-EMA STA may not know how many beacon frames are needed to receive a full set of the nontransmitted BSSID profiles for the multiple BSSID set. As a result, the non-EMA STA may not discover any of the remaining nontransmitted BSSIDs of the multiple BSSID set (such as NTX_BSSID_1, NTX_BSSID_2, NTX_BSSID_5, or NTX_BSSID_6).

Moreover, once associated with a nontransmitted BSSID of the multiple BSSID set, the non-EMA STA may have difficulty maintaining connectivity with the nontransmitted BSSID. For example, a STA may expect to receive beacon frames at regular intervals from the BSSID to which it is associated. If a STA misses too many beacon frames from its associated BSSID, it may assume the BSSID is no longer available and may tear down the connection with the BSSID. With reference for example to FIG. 8, a non-EMA STA must wait at least 3 beacon intervals to receive a successive beacon frame that advertises information for the same nontransmitted BSSID profile (such as from times $t_0$ to $t_3$). If the non-EMA STA misses a number (L) of beacon frames carrying the nontransmitted BSSID profile for the BSSID with which it is associated (where L is greater than a beacon-miss tolerance threshold), the non-EMA STA may tear down its connection with the BSSID shortly after association. As a result, the non-EMA STA may be unable to maintain connectivity with any of the nontransmitted BSSIDs (NTX_BSSID_1-NTX_BSSID_6) of the multiple BSSID set.

Various aspects relate generally to multiple BSSID sets, and more particularly, to beacon frame broadcast techniques for establishing and maintaining connectivity between APs that provide multiple BSSID sets and non-EMA STAs. In some implementations, a wireless communication device may transmit a burst of beacon frames each carrying a respective partial list of nontransmitted BSSID profiles for a multiple BSSID set. In such implementations, the bursts of beacon frames may be transmitted periodically such that the start of each burst occurs one beacon interval after the start of a prior burst. As a result, the partial list of nontransmitted BSSID profiles in each beacon frame may be advertised with a respective periodicity equal to one beacon interval. In some other implementations, a wireless communication device may broadcast multiple beacon frames each carrying a full set of nontransmitted BSSID profiles associated with a respective multiple BSSID set. In such implementations, each beacon frame may be periodically broadcast every beacon interval. As a result, the full set of nontransmitted BSSID profiles for each multiple BSSID set may be advertised with a periodicity equal to one beacon interval.

Particular implementations of the subject matter described in this disclosure can be implemented to realize one or more of the following potential advantages. Aspects of the present disclosure may ensure interoperability between EMA APs and non-EMA STAs by advertising each nontransmitted BSSID profile of a multiple BSSID set at a periodicity equal to one beacon interval. For example, during discovery, a non-EMA STA may receive a full set of nontransmitted BSSID profiles for a multiple BSSID set by listening to a burst of beacon frames broadcast by a wireless communication device for a multiple BSSID set (where each beacon frame carries a respective partial list of nontransmitted BSSID profiles for the multiple BSSID set) or by listening to one or more beacon frames broadcast by a wireless communication device for one or more multiple BSSID sets, respectively (where each beacon frame carries a full set of nontransmitted BSSID profiles for the multiple BSSID set). Because each nontransmitted BSSID profile is advertised at a periodicity equal to one beacon interval, a non-EMA STA may be less likely to lose its connection to a nontransmitted BSSID after association.

Figure 9:
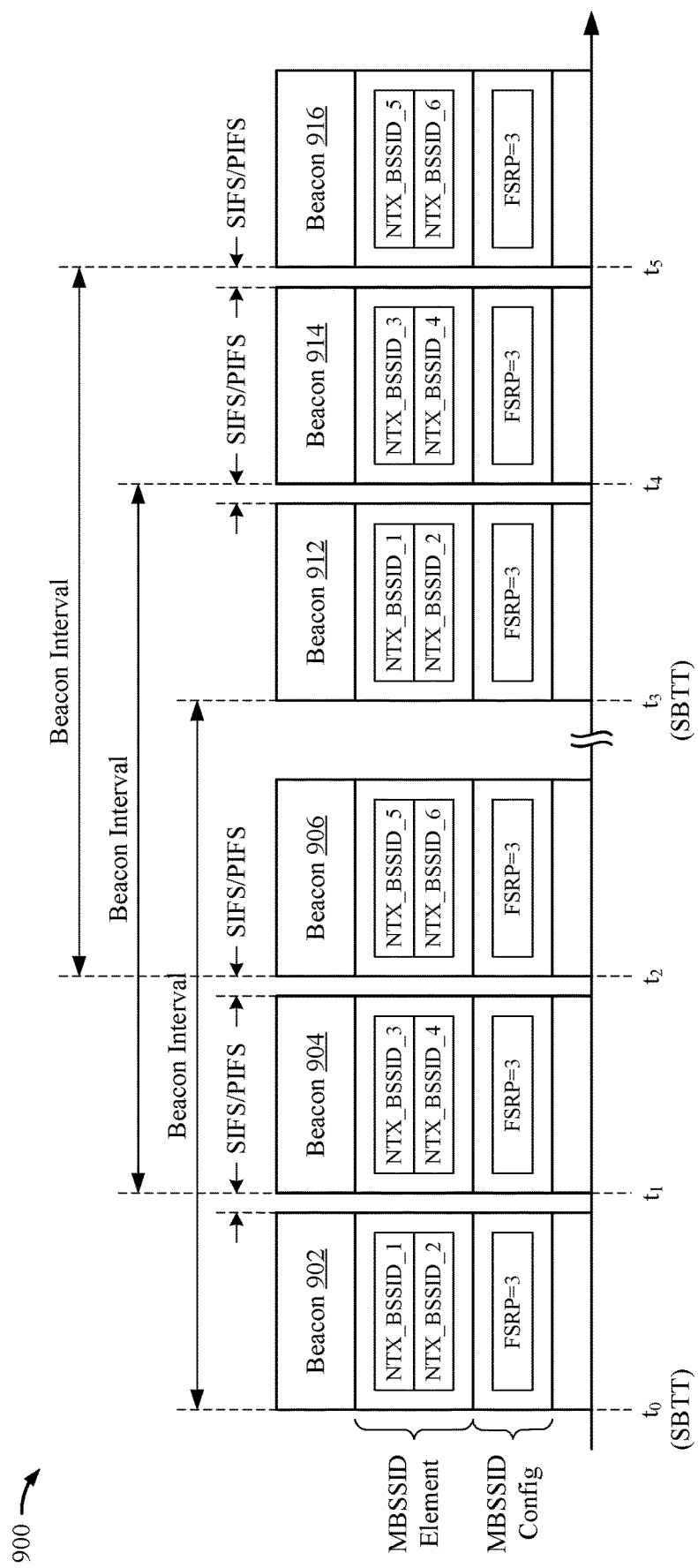
FIG. 9 shows a timing diagram depicting an example sequence of beacon frames advertising multiple BSSIDs according to some implementations.

FIG. 9 shows a timing diagram 900 depicting an example sequence of beacon frames 902-916 advertising multiple BSSIDs according to some implementations. More specifically, the beacon frames 902-912 may be broadcast by an AP corresponding to the transmitted BSSID of a multiple BSSID set. In the example of FIG. 9, the multiple BSSID set includes 6 nontransmitted BSSIDs (NTX_BSSID_1-NTX_BSSID_6). With reference for example to FIG. 6, the transmitted BSSID of the multiple BSSID set may be one example of BSSID1 and NTX_BSSID_1-NTX_BSSID_6 may be examples of BSSID2-BSSID7, respectively. Each of the beacon frames 902-912 includes a multiple BSSID element and a multiple BSSID configuration element.

In some implementations, the AP may transmit a burst of beacon frames at periodic intervals. In such implementations, each beacon frame advertises a partial list of nontransmitted BSSID profiles for the multiple BSSID set so that each burst of beacon frames collectively advertises the full set of nontransmitted BSSID profiles of the multiple BSSID set. The start of each burst may be referred to herein as a "start of burst transmission time" (SBTT). As shown in FIG. 9, each SBTT coincides with a TBTT of the first beacon frame transmitted in a respective burst. Each subsequent beacon frame of a burst is transmitted immediately after the preceding beacon frame in the burst. For example, the duration between successive beacon frames in a burst may be equal to a short interframe space (SIFS) duration, a priority interframe space (PIFS) duration, a distributed coordination function (DCF) interframe space (DIFS) duration, or any other suitable duration short enough to prevent other STAs or APs from contending on or accessing the shared wireless medium.

At time $t_0$, which coincides with an SBTT, the AP broadcasts the beacon frame 902 to advertise a partial list of nontransmitted BSSID profiles for the multiple BSSID set. For example, the multiple BSSID element of the beacon frame 902 is shown to include nontransmitted BSSID profile subelements for NTX_BSSID_1 and NTX_BSSID_2. At time $t_1$, which occurs one SIFS or PIFS duration after the beacon frame 902, the AP broadcasts the beacon frame 904 to advertise another partial list of nontransmitted BSSID profiles for the multiple BSSID set. For example, the multiple BSSID element of the beacon frame 904 is shown to include nontransmitted BSSID profile subelements for NTX_BSSID_3 and NTX_BSSID_4. At time $t_2$, which occurs one SIFS or PIFS duration after the beacon frame 904, the AP broadcasts the beacon frame 906 to advertise another partial list of nontransmitted BSSID profiles for the multiple BSSID set. For example, the multiple BSSID element of the beacon frame 906 is shown to include nontransmitted BSSID profile subelements for NTX_BSSID_3 and NTX_BSSID_4.

At time $t_3$, which coincides with a subsequent SBTT, the AP broadcasts the beacon frame 912 to advertise the partial list of nontransmitted BSSID profiles previously advertised in the beacon frame 902. As shown in FIG. 9, the beacon frame 912 is broadcast one beacon interval after the beacon frame 902. At time $t_4$, which occurs one SIFS or PIFS duration after the beacon frame 912, the AP broadcasts the beacon frame 914 to advertise the partial list of nontransmitted BSSID profiles previously advertised in the beacon frame 904. As shown in FIG. 9, the beacon frame 914 is broadcast one beacon interval after the beacon frame 904. At time $t_5$, which occurs one SIFS or PIFS duration after the beacon frame 914, the AP broadcasts the beacon frame 916 to advertise the partial list of nontransmitted BSSID profiles previously advertised in the beacon frame 906. As shown in FIG. 9, the beacon frame 916 is broadcast one beacon interval after the beacon frame 906.

In the example of FIG. 9, each of the beacon frames 902-916 is shown to include one multiple BSSID element with two nontransmitted multiple BSSID profile subelements (each carrying BSSID information for a respective nontransmitted BSSID of the multiple BSSID set). As such, the nontransmitted BSSID profiles of the multiple BSSID set are distributed across a total of three successive beacon frames (such as from times $t_0$ to $t_2$ and from times $t_3$ to $t_5$). The multiple BSSID configuration element in each of the beacon frames 902-912 therefore carries an FSRP value equal to 3. However, in actual implementations, each of the beacon frames 902-912 may include any number of multiple BSSID elements with any number of nontransmitted BSSID profile subelements. Moreover, each burst may include fewer or more beacon frames than those depicted in FIG. 9.

By transmitting a burst of beacon frames at each SBTT, aspects of the present disclosure may ensure interoperability between EMA APs and non-EMA STAs. For example, because the beacon frames in a burst are transmitted immediately after one another, a non-EMA STA is likely to receive all of the beacon frames of a given burst during discovery. As such, the non-EMA STA may discover all of the nontransmitted BSSIDs of a multiple BSSID set prior to associating (or determining whether to associate) with any of the BSSIDs in the multiple BSSID set. Further, because beacon fames advertising the same nontransmitted BSSID profiles are broadcast one beacon interval apart, a non-EMA STA that associates with any of the nontransmitted BSSIDs of the multiple BSSID set may receive beacon frames advertising the nontransmitted BSSID at regular beacon intervals. For example, a non-EMA STA that associates with NTX_BSSID_3 may receive the beacon frame 904 at time $t_1$ as well as the beacon frame 914 at time $t_4$, and thus avoid tearing down its connection to NTX_BSSID_3.

Figure 10:
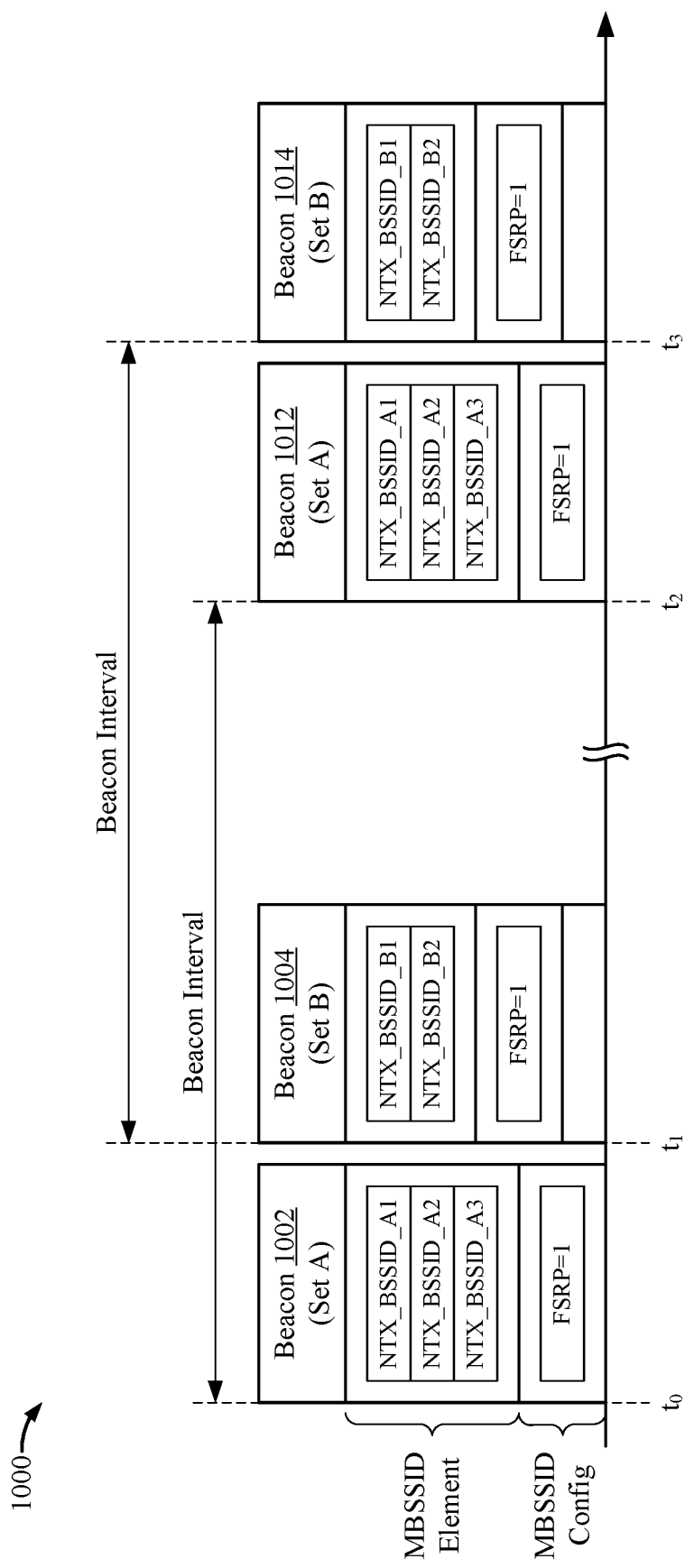
FIG. 10 shows a timing diagram depicting another example sequence of beacon frames advertising multiple BSSIDs according to some implementations.

FIG. 10 shows a timing diagram 1000 depicting another example sequence of beacon frames 1002-1014 advertising multiple BSSIDs according to some implementations. More specifically, the beacon frames 1002 and 1012 may be broadcast by a first AP corresponding to the transmitted BSSID of a first multiple BSSID set (Set A) and the beacon frames 1004 and 1014 may be broadcast by a second AP corresponding to the transmitted BSSID of a second multiple BSSID set (Set B). In the example of FIG. 10, Set A includes 3 nontransmitted BSSIDs (NTX_BSSID_A1-NTX_BSSID_A3) and Set B includes 2 nontransmitted BSSIDs (NTX_BSSID_B1 and NTX_BSSID_B2). Each of the beacon frames 1002-1014 includes a multiple BSSID element and a multiple BSSID configuration element.

In some implementations, all 7 BSSIDs included across Set A and Set B may be provided by the same wireless communication device. With reference for example to FIG. 6, the transmitted BSSID of Set A may be one example of BSSID1 and NTX_BSSID_A1-NTX_BSSID_A3 may be examples of BSSID2-BSSID4, respectively, while the transmitted BSSID of Set B may be one example of BSSID5 and NTX_BSSID_B1 and NTX_BSSID_B2 may be examples of BSSID6 and BSSID7, respectively. In some implementations, the wireless communication device may partition a large group of BSSIDs into smaller multiple BSSID sets (in lieu of one large multiple BSSID set) so that all the nontransmitted BSSID profiles for each multiple BSSID set can be advertised in a single beacon frame. For example, the wireless communication device may subdivide a number (N) of BSSIDs into a number (m) of multiple BSSID sets so that each set includes ~N/m BSSIDs. Given a desired beacon frame size (B), the wireless communication device may determine a tuple (m, B) that ensures each multiple BSSID set has an FSRP value equal to 1.

At time $t_0$, the first AP broadcasts the beacon frame 1002 to advertise the full set of nontransmitted BSSID profiles for Set A. For example, the multiple BSSID element of the beacon frame 1002 is shown to include nontransmitted BSSID profile subelements for NTX_BSSID_A1-NTX_BSSID_A3. At time $t_1$, the second AP broadcasts the beacon frame 1004 to advertise the full set of nontransmitted BSSID profiles for Set B. For example, the multiple BSSID element of the beacon frame 1004 is shown to include nontransmitted BSSID profile subelements for NTX_BSSID_B1 and NTX_BSSID_B2. At time $t_2$, the first AP broadcasts the beacon frame 1012 to advertise the full set of nontransmitted BSSID profiles previously advertised in the beacon frame 1002. As shown in FIG. 10, the beacon frame 1012 is broadcast one beacon interval after the beacon frame 1002. At time $t_3$, the first AP broadcasts the beacon frame 1014 to advertise the full set of nontransmitted BSSID profiles previously advertised in the beacon frame 1004. As shown in FIG. 10, the beacon frame 1014 is broadcast one beacon interval after the beacon frame 1004.

In the example of FIG. 10, each of the beacon frames 1002 and 1012 is shown to include one multiple BSSID element with three nontransmitted multiple BSSID profile subelements. As such, all nontransmitted BSSID profiles of Set A are included in each beacon frame broadcast by the first AP. Thus, the multiple BSSID configuration element in each of the beacon frames 1002 and 1012 carries an FSRP value equal to 1. Similarly, each of the beacon frames 1004 and 1014 is shown to include one multiple BSSID element with two nontransmitted multiple BSSID profile subelements. As such, all nontransmitted BSSID profiles of Set B are included in each beacon frame broadcast by the second AP. Thus, the multiple BSSID configuration element in each of the beacon frames 1004 and 1014 also carries an FSRP value equal to 1. However, in actual implementations, each of the beacon frames 1002-1014 may include any number of multiple BSSID elements with any number of nontransmitted BSSID profile subelements (without increasing the FSRP value). In some other implementations, because EMA is not necessary for an FSRP value equal to 1, the multiple BSSID configuration element may be omitted from the beacon frames 1002-1014.

By partitioning a large group of BSSIDs into smaller multiple BSSID sets, aspects of the present disclosure may ensure interoperability between EMA APs and non-EMA STAs. For example, because each beacon frame advertises a full set of nontransmitted BSSID profiles for a respective multiple BSSID set, a non-EMA STA may discover all of the nontransmitted BSSIDs of a multiple BSSID set prior to associating (or determining whether to associate) with any of the BSSIDs in the multiple BSSID set. Further, because beacon fames advertising the same nontransmitted BSSID profiles are broadcast one beacon interval apart, a non-EMA STA that associates with any of the nontransmitted BSSIDs of the multiple BSSID set may receive beacon frames advertising the nontransmitted BSSID at regular beacon intervals. For example, a non-EMA STA that associates with NTX_BSSID_A3 may receive the beacon frame 1002 at time $t_1$ as well as the beacon frame 1012 at time $t_2$, and thus avoid tearing down its connection to NTX_BSSID_A3.

In some implementations, the FSRP value associated with one or more of the multiple BSSID sets may be increased to a value greater than 1, for example, if the BSSID information associated with a full set of nontransmitted BSSID profiles can no longer fit in a single beacon frame or if a multiple BSSID set no longer needs to support non-EMA STAs. In some other implementations, the beacon transmission techniques described with reference to FIG. 10 may be combined with the beacon transmission techniques described with reference to FIG. 9. For example, after subdividing a large group of BSSIDs into smaller multiple BSSID sets, a wireless communication device may further transmit a burst of beacon frames for one or more of the multiple BSSID sets at respective SBTTs, where each beacon frame in the burst advertises a partial list of nontransmitted BSSID profiles for the multiple BSSID set. For example, the multiple BSSID set depicted in FIG. 9 may correspond to any of the multiple BSSID sets (such as Set A or Set B) of FIG. 10. This may further ensure interoperability between EMA APs and non-EMA STAs if the FSRP value for any of the multiple BSSID sets increases beyond 1.

Aspects of the present disclosure recognize that, after subdividing a large group of BSSIDs into smaller multiple BSSID sets, the resulting multiple BSSID sets may have the same BSS color. With reference for example to FIG. 6, BSSID1-BSSID7 may share the same BSSID color before and after being assigned to different multiple BSSID groups. A STA may report a BSS color collision if it detects a PPDU with at least three address fields (such as a receiver address, a transmitted address, and a BSSID) in the MAC header, and with the same BSS color as its associated BSS, in which none of the address fields match the BSSID of the associated BSS or any other BSSIDs in the same multiple BSSID set to which its BSS belongs. according to existing versions of the IEEE 802.11 standard, members of the same multiple BSSID set are required to have the same 48-n bits (BSSID [0:(47-n)]) in their BSSIDs, where n is the value of a max BSSID indicator field (such as the max BSSID indicator field 722 of FIG. 7).

Aspects of the present disclosure further recognize that there is currently no requirement for BSSIDs of different multiple BSSID sets to be correlated. As such, beacon frames broadcast by different APs of the same wireless communication device may result in BSS color collisions. In some implementations, to avoid BSS color collisions, each multiple BSSID set may be assigned a different BSS color. In some other implementations, the BSSIDs in each multiple BSSID set may be correlated with the BSSIDs in each of the remaining multiple BSSID sets. More specifically, the BSSIDs values may be assigned so that the first 48-n bits of each BSSID in a first multiple BSSID set are the same as the first 48-n bits of each BSSID in the remaining multiple BSSID sets. With reference for example to FIG. 10, if the beacon frame 1002 carries an n value equal to 2 (n=2), the first 46 bits of at least one of the address fields in the beacon frame 1002 should match the first 46 bits of at least one of the BSSIDs in Set B. On the other hand, if the beacon frame 1004 carries an n value equal to 1 (n=1), the first 47 bits of at least one of the address fields in the beacon frame 1004 should match the first 47 bits of at least one of the BSSIDs in Set A.

In some aspects, BSSIDs belonging to different multiple BSSID sets may be derived from the same sequence of values such that the BSSIDs in each multiple BSSID set span a respective range of values in the sequence. With reference for example to FIG. 10, the BSSIDs in Sets A and B may be derived from an ordered sequence of values M1, M2, M3, M4, M5, M6, and M7. More specifically, the 4 BSSIDs in Set A may span the range of values M1-M4 while the 3 BSSIDs in Set B may span the range of values M5-M7. In some implementations, to ensure that 48-n bits are the same across the BSSIDs in each of the multiple BSSID sets, the value of n may be determined based on the number of active BSSIDs across the multiple BSSID sets. With reference for example to FIG. 10, Set A includes 4 active BSSIDs (N=4) and Set B includes 3 active BSSIDs (M=3). Thus, each of the beacon frames 1002 and 1012 may carry an n value such that $2^n \geq N+M$ and each of the beacon frames 1004 and 1014 may carry the same n value as the beacon frame 1002 and 1012. Because N+M=7, n may be any integer value greater than or equal to 3.

Figure 11:
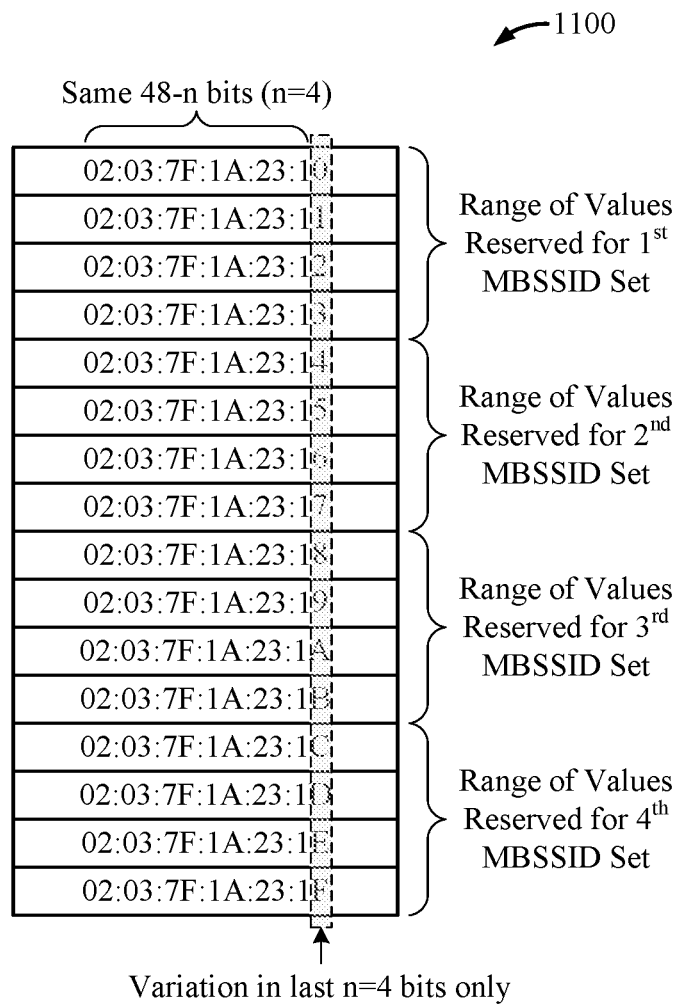
FIG. 11 shows an example set of values that can be assigned as the BSSIDs for two or more multiple BSSID sets.

FIG. 11 shows an example set of values 1100 that can be assigned as the BSSIDs for two or more multiple BSSID sets. In the example of FIG. 11, the values range from 02:03:7F:1A:23:10 to 02:03:7F:1A:23:1F. Thus, only the last hexadecimal digit (representing the last 4 bits of each value) varies among the set of values 1100. In other words, the first 44 bits are the same for each value in the set 1100.

In some implementations, the range of values 1100 may be used to derive the BSSIDs for different multiple BSSID sets. For example, as shown in FIG. 11, the first 4 values 02:03:7F:1A:23:10 to 02:03:7F:1A:23:13 may be reserved for BSSIDs of a first multiple BSSID set, the next 4 values 02:03:7F:1A:23:14 to 02:03:7F:1A:23:17 may be reserved for BSSIDs of a second multiple BSSID set, the next 4 values 02:03:7F:1A:23:18 to 02:03:7F:1A:23:1B may be reserved for BSSIDs of a third multiple BSSID set, and the next 4 values 02:03:7F:1A:23:1C to 02:03:7F:1A:23:1F may be reserved for BSSIDs of a fourth multiple BSSID set. With reference for example to FIG. 10, the values ranging from 02:03:7F:1A:23:10 to 02:03:7F:1A:23:13 may be assigned to the 4 BSSIDs in Set A and any 3 values in the range 02:03:7F:1A:23:14 to 02:03:7F:1A:23:17 may be assigned to the 3 BSSIDs in Set B. In this example, the remaining values in the set 1100 (such as from 02:03:7F:1A:23:18 to 02:03:7F:1A:23:1F) are left unassigned.

In some implementations, beacon frames advertising any of the BSSIDs associated with the set of values 1100 may carry an n value equal to 4 (in the max BSSID indicator field). In such implementations, the first 48-n bits will be the same for all BSSIDs derived from the set of values 1100. With reference for example to FIG. 10, each of the beacon frames 1002-1014 may carry an n value equal to 4. Thus, a STA that is associated with a BSSID in Set B may receive any of the beacon frames 1002 or 1012 and determine that the first 44 bits of one or more address fields in the received beacon frame are the same as the first 44 bits of each BSSID in Set B. As such, the STA may not report a BSS color collision in response to receiving a beacon frame from a different multiple BSSID set having the same BSS color as its associated BSSID.

Figure 12A:
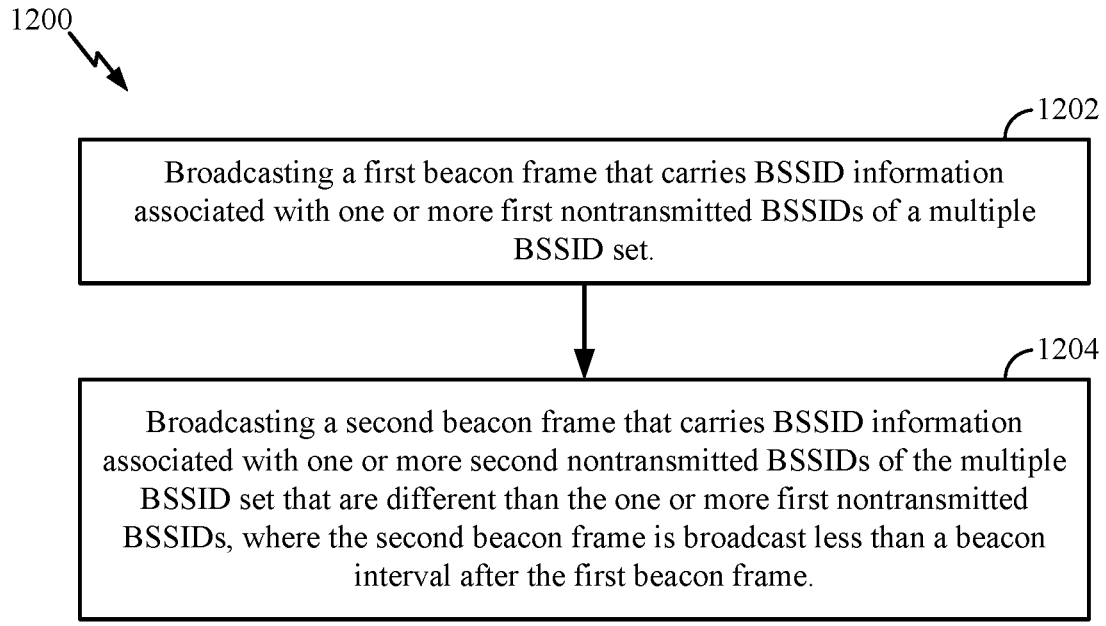
FIG. 12A shows a flowchart illustrating an example process for multiple BSSID beacon broadcast according to some implementations.

FIG. 12A shows a flowchart illustrating an example process 1200 for multiple BSSID beacon broadcast according to some implementations. In some implementations, the process 1200 may be performed by a wireless communication device operating as or within an AP, such as one of the APs 102 or 502 described above with reference to FIGS. 1 and 5A, respectively, or the wireless communication device 600 described above with reference to FIG. 6.

In some implementations, the process 1200 begins in block 1202 with broadcasting a first beacon frame that carries BSSID information associated with one or more first nontransmitted BSSIDs of a multiple BSSID set. In block 1204, the process 1200 proceeds with broadcasting a second beacon frame that carries BSSID information associated with one or more second nontransmitted BSSIDs of the multiple BSSID set that are different than the one or more first nontransmitted BSSIDs, where the second beacon frame is broadcast less than a beacon interval after the first beacon frame.

In some implementations, the first beacon frame may include a respective transmitter address indicating a transmitted BSSID of the multiple BSSID set and the second beacon frame may include a respective transmitter address indicating the transmitted BSSID of the multiple BSSID set. In some implementations, each of the first and second beacon frames may include a respective multiple BSSID configuration element having an FSRP field that is set to a value greater than 1. In some implementations, the FSRP field of the first beacon frame may be set to the same value as the FSRP field of the second beacon frame.

Figure 12B:
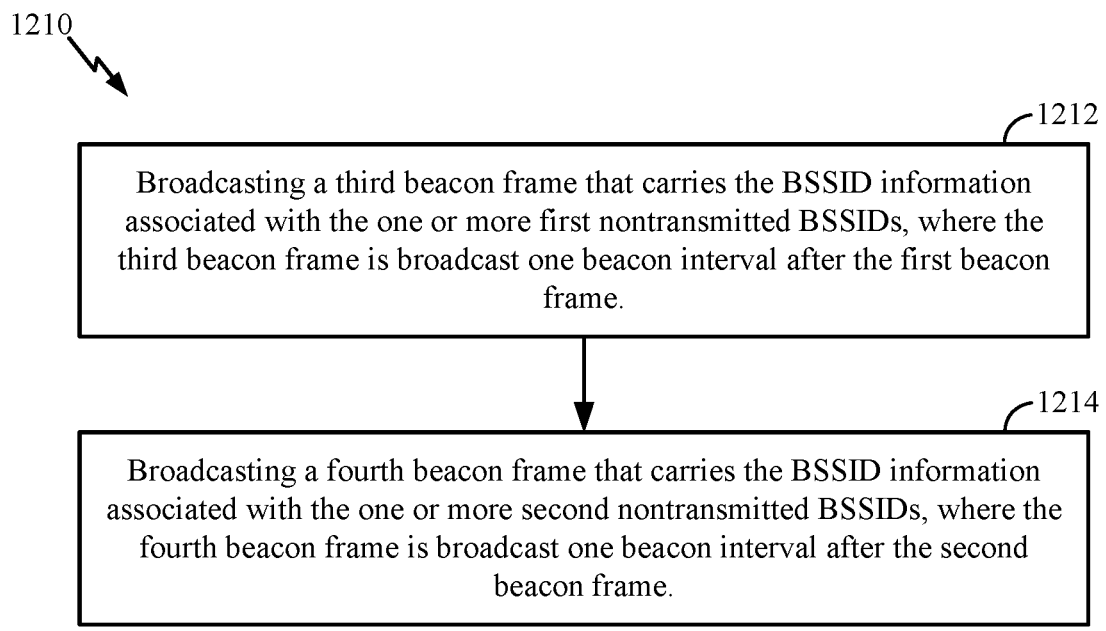
FIG. 12B shows a flowchart illustrating an example process for multiple BSSID beacon broadcast according to some implementations.

FIG. 12B shows a flowchart illustrating an example process 1210 for multiple BSSID beacon broadcast according to some implementations. In some implementations, the process 1210 may be performed by a wireless communication device operating as or within an AP, such as one of the APs 102 or 502 described above with reference to FIGS. 1 and 5A, respectively, or the wireless communication device 600 described above with reference to FIG. 6.

With reference for example to FIG. 12A, the process 1210 may begin, in block 1212, after the broadcasts of the first and second beacon frames in blocks 1202 and 1204, respectively, of the process 1200. In block 1212, the process 1210 begins by broadcasting a third beacon frame that carries the BSSID information associated with the one or more first nontransmitted BSSIDs, where the third beacon frame is broadcast one beacon interval after the first beacon frame. In block 1214, the process 1210 proceeds with broadcasting a fourth beacon frame that carries the BSSID information associated with the one or more second nontransmitted BSSIDs, where the fourth beacon frame is broadcast one beacon interval after the second beacon frame.

In some implementations, the third beacon frame may include a respective transmitter address indicating the transmitted BSSID of the multiple BSSID set and the fourth beacon frame may include a respective transmitter address indicating the transmitted BSSID of the multiple BSSID set. In some implementations, each of the third and fourth beacon frames may include a respective multiple BSSID configuration element having an FSRP field that is set to a value greater than 1. In some implementations, the FSRP fields of the first, second, third, and fourth beacon frames may be set to the same value.

Figure 13A:
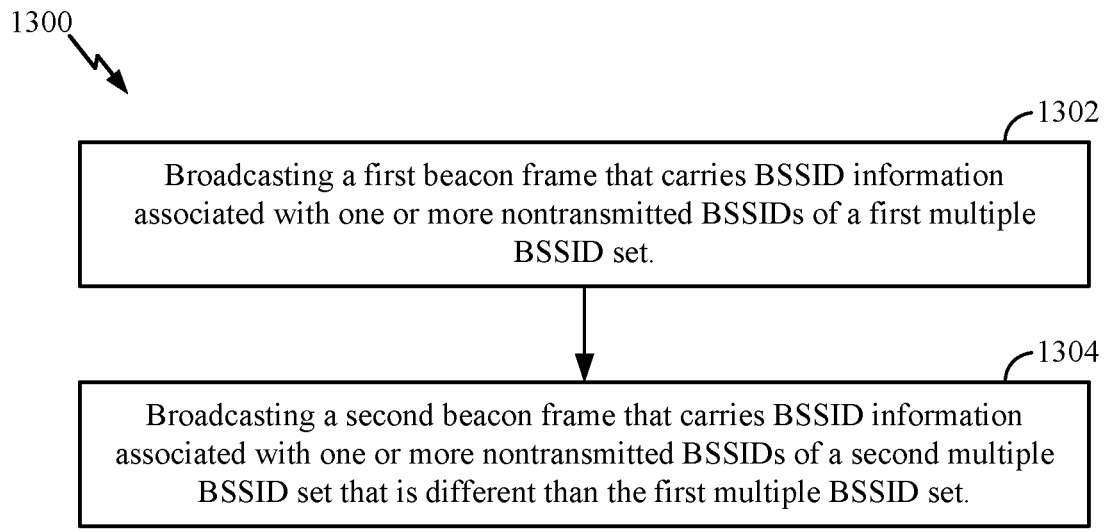
FIG. 13A shows a flowchart illustrating an example process for multiple BSSID beacon broadcast according to some implementations.

FIG. 13A shows a flowchart illustrating an example process 1300 for multiple BSSID beacon broadcast according to some implementations. In some implementations, the process 1300 may be performed by a wireless communication device operating as or within an AP, such as one of the APs 102 or 502 described above with reference to FIGS. 1 and 5A, respectively, or the wireless communication device 600 described above with reference to FIG. 6.

In some implementations, the process 1300 begins in block 1302 with broadcasting a first beacon frame that carries BSSID information associated with one or more nontransmitted BSSIDs of a first multiple BSSID set. In block 1304, the process 1300 proceeds with broadcasting a second beacon frame that carries BSSID information associated with one or more nontransmitted BSSIDs of a second multiple BSSID set that is different than the first multiple BSSID set. In some implementations, the first beacon frame may include a respective transmitter address indicating a transmitted BSSID of the first multiple BSSID set and the second beacon frame may include a respective transmitter address indicating a transmitted BSSID of the second multiple BSSID set.

In some implementations, each of the first and second beacon frames may include a respective multiple BSSID configuration element having an FSRP field that is set to a value equal to 1. In some other implementations, the first beacon frame may include a respective multiple BSSID configuration element having an FSRP field that is set to a first value and the second beacon frame may include a respective multiple BSSID configuration element having an FSRP field that is set to a second value.

In some implementations, BSSIDs in the first multiple BSSID set may span a first range of values in an ordered sequence of values and BSSIDs in the second multiple BSSID set may span a second range of values in the ordered sequence that does not overlap the first range. In some implementations, the first beacon frame may include one or more multiple BSSID elements each having a respective maximum BSSID indicator field that is set to a value (n), where the first 48-n bits of each BSSID in the first multiple BSSID set are the same as the first 48-n bits of each BSSID in the second multiple BSSID set. In some implementations, each of the first and second multiple BSSID elements may include a respective maximum BSSID indicator field that is set to a value (n) based on a number (N) of BSSIDs in the first multiple BSSID set and a number (M) of BSSIDs in the second multiple BSSID set, for example, where $2^n \geq N+M$.

In some implementations, the first beacon frame may include a respective transmitter address indicating a transmitted BSSID of the multiple BSSID set and the second beacon frame may include a respective transmitter address indicating the transmitted BSSID of the multiple BSSID set. In some implementations, each of the first and second beacon frames may include a respective multiple BSSID configuration element having an FSRP field that is set to a value greater than 1. In some implementations, the FSRP field of the first beacon frame may be set to the same value as the FSRP field of the second beacon frame.

In some aspects, a third beacon frame may be broadcast less than a beacon interval after the first beacon frame, where the third beacon frame carries BSSID information associated with one or more nontransmitted BSSIDs of the first multiple BSSID set that are different than the nontransmitted BSSIDs associated with the BSSID information carried in the first beacon frame. In some implementations, the first and third beacon frames may be broadcast as a burst transmission. In some aspects, a fourth beacon frame may be broadcast less than a beacon interval after the second beacon frame, where the fourth beacon frame carries BSSID information associated with one or more nontransmitted BSSIDs of the second multiple BSSID set that are different than the nontransmitted BSSIDs associated with the BSSID information carried in the second beacon frame.

Figure 13B:
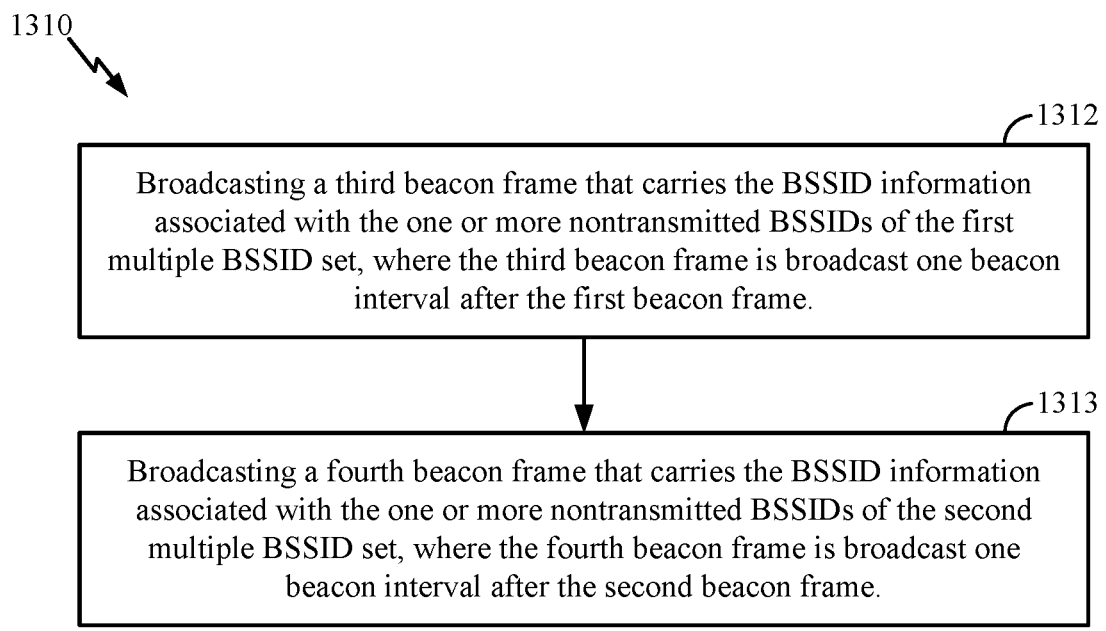
FIG. 13B shows a flowchart illustrating an example process for multiple BSSID beacon broadcast according to some implementations.

FIG. 13B shows a flowchart illustrating an example process 1310 for multiple BSSID beacon broadcast according to some implementations. In some implementations, the process 1310 may be performed by a wireless communication device operating as or within an AP, such as one of the APs 102 or 502 described above with reference to FIGS. 1 and 5A, respectively, or the wireless communication device 600 described above with reference to FIG. 6.

With reference for example to FIG. 13A, the process 1310 may begin, in block 1312, after the broadcasts of the first and second beacon frames in blocks 1302 and 1304, respectively, of the process 1300. In block 1312, the process 1310 begins by broadcasting a third beacon frame that carries the BSSID information associated with the one or more nontransmitted BSSIDs of the first multiple BSSID set, where the third beacon frame is broadcast one beacon interval after the first beacon frame. In block 1314, the process 1310 proceeds with broadcasting a fourth beacon frame that carries the BSSID information associated with the one or more nontransmitted BSSIDs of the second multiple BSSID set, where the fourth beacon frame is broadcast one beacon interval after the second beacon frame.

Figure 14:
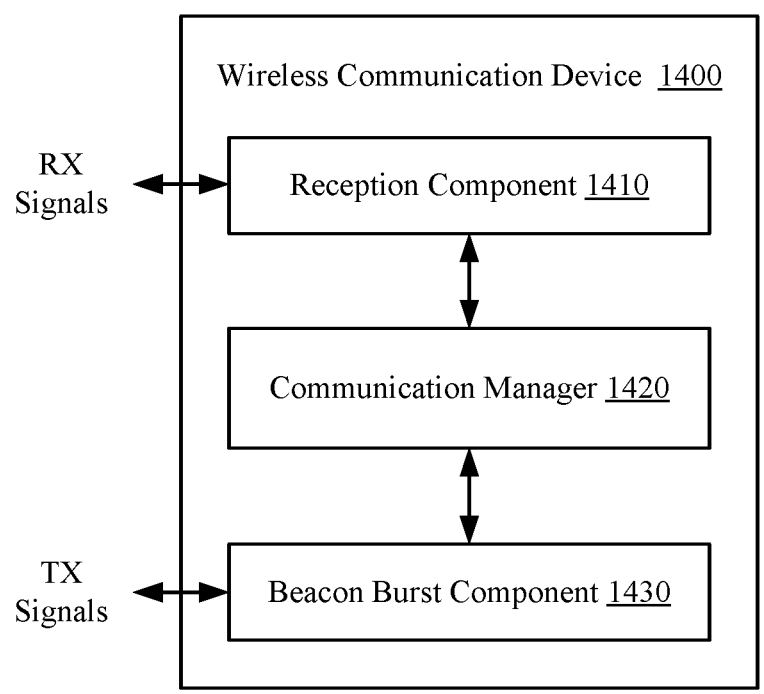
FIG. 14 shows a block diagram of an example wireless communication device according to some implementations.

FIG. 14 shows a block diagram of an example wireless communication device 1400 according to some implementations. In some implementations, the wireless communication device 1400 is configured to perform any of the processes 1200 or 1210 described above with reference to FIGS. 12A and 12B, respectively. The wireless communication device 1400 can be an example implementation of the wireless communication device 400 described above with reference to FIG. 4. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a beacon burst component 1430. Portions of the beacon burst component 1430 may be implemented at least in part in hardware or firmware. In some implementations, the beacon burst component 1430 is implemented at least in part as software stored in a memory (such as the memory 408). For example, portions of the beacon burst component 1430 can be implemented as non-transitory instructions (or "code") executable by a processor (such as the processor 406) to perform the functions or operations of the respective component.

The reception component 1410 is configured to receive RX signals, over a wireless channel, from one or more other wireless communication devices. The communication manager 1420 is configured to control or manage communications with the one or more other wireless communication devices. The beacon burst component 1430 is configured to transmit TX signals, over the wireless channel, to one or more other wireless communication devices. In some implementations, the beacon burst component 1430 may broadcast a first beacon frame that carries BSSID information associated with one or more first nontransmitted BSSIDs of a multiple BSSID set and may further broadcast a second beacon frame that carries BSSID information associated with one or more second nontransmitted BSSIDs of the multiple BSSID set that are different than the one or more first nontransmitted BSSIDs, where the second beacon frame is broadcast less than a beacon interval after the first beacon frame.

Figure 15:
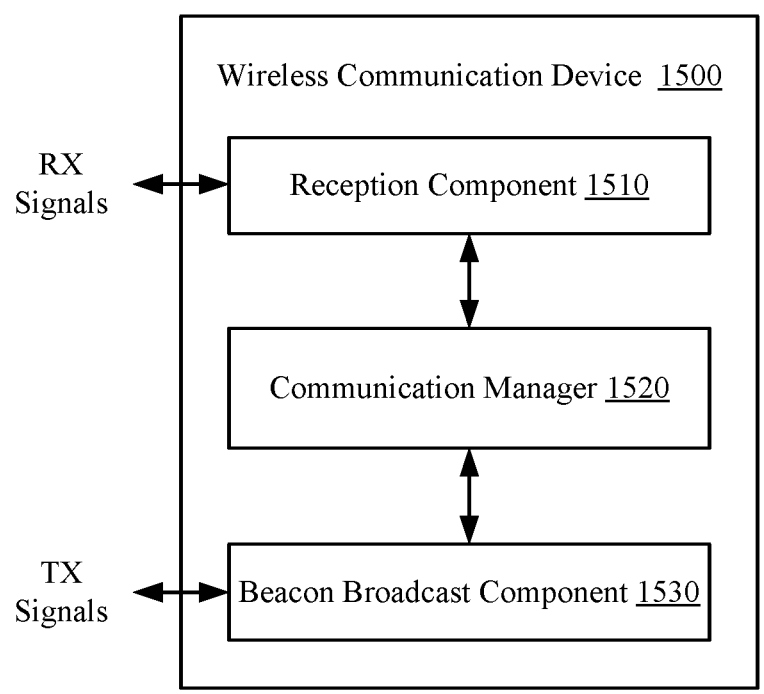
FIG. 15 shows a block diagram of an example wireless communication device according to some implementations.

FIG. 15 shows a block diagram of an example wireless communication device 1500 according to some implementations. In some implementations, the wireless communication device 1500 is configured to perform any of the processes 1300 or 1310 described above with reference to FIGS. 13A and 13B, respectively. The wireless communication device 1500 can be an example implementation of the wireless communication device 400 described above with reference to FIG. 4. For example, the wireless communication device 1500 can be a chip, SoC, chipset, package or device that includes at least one processor and at least one modem (for example, a Wi-Fi (IEEE 802.11) modem or a cellular modem).

The wireless communication device 1500 includes a reception component 1510, a communication manager 1520, and a beacon broadcast component 1530. Portions of the beacon broadcast component 1530 may be implemented at least in part in hardware or firmware. In some implementations, the beacon broadcast component 1530 is implemented at least in part as software stored in a memory (such as the memory 408). For example, portions of the beacon broadcast component 1530 can be implemented as non-transitory instructions (or "code") executable by a processor (such as the processor 406) to perform the functions or operations of the respective component.

The reception component 1510 is configured to receive RX signals, over a wireless channel, from one or more other wireless communication devices. The communication manager 1520 is configured to control or manage communications with the one or more other wireless communication devices. The beacon broadcast component 1530 is configured to transmit TX signals, over the wireless channel, to one or more other wireless communication devices. In some implementations, the beacon broadcast component 1530 may broadcast a first beacon frame that carries BSSID information associated with one or more nontransmitted BSSIDs of a first multiple BSSID set and may further broadcast a second beacon frame that carries BSSID information associated with one or more nontransmitted BSSIDs of a second multiple BSSID set that is different than the first multiple BSSID set.

Implementation examples are described in the following numbered clauses:

1. A method for wireless communication by a wireless communication device, including:
   broadcasting a first beacon frame that carries basic service set identifier (BSSID) information associated with one or more first nontransmitted BSSIDs of a multiple BSSID set; and
   broadcasting a second beacon frame that carries BSSID information associated with one or more second nontransmitted BSSIDs of the multiple BSSID set that are different than the one or more first nontransmitted BSSIDs, the second beacon frame being broadcast less than a beacon interval after the first beacon frame.
2. The method of clause 1, where the first and second beacon frames are broadcast as a burst transmission.
3. The method of any of clauses 1 or 2, where the first beacon frame includes a respective transmitter address indicating a transmitted BSSID of the multiple BSSID set and the second beacon frame includes a respective transmitter address indicating the transmitted BSSID of the multiple BSSID set.
4. The method of any of clauses 1-3, where each of the first and second beacon frames includes a respective multiple BSSID configuration element having a full set receive periodicity (FSRP) field that is set to a value greater than 1.
5. The method of any of clauses 1-4, where the FSRP field of the first beacon frame is set to the same value as the FSRP field of the second beacon frame.
6. The method any of clauses 1-5, further including:
   broadcasting a third beacon frame that carries the BSSID information associated with the one or more first nontransmitted BSSIDs, the third beacon frame being broadcast one beacon interval after the first beacon frame; and
   broadcasting a fourth beacon frame that carries the BSSID information associated with the one or more second nontransmitted BSSIDs, the fourth beacon frame being broadcast one beacon interval after the second beacon frame.
7. The method of any of clauses 1-6, where the third beacon frame includes a respective transmitter address indicating the transmitted BSSID of the multiple BSSID set and the fourth beacon frame includes a respective transmitter address indicating the transmitted BSSID of the multiple BSSID set.
8. The method of any of clauses 1-7, where each of the third and fourth beacon frames includes a respective multiple BSSID configuration element having an FSRP field that is set to a value greater than 1.
9. The method of any of clauses 1-8, where the FSRP fields of the first, second, third, and fourth beacon frames are set to the same value.
10. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to perform the method of any one or more of clauses 1-9.
11. A method for wireless communication performed by a wireless communication device, including:
    broadcasting a first beacon frame that carries basic service set identifier (BSSID) information associated with one or more nontransmitted BSSIDs of a first multiple BSSID set; and
    broadcasting a second beacon frame that carries BSSID information associated with one or more nontransmitted BSSIDs of a second multiple BSSID set that is different than the first multiple BSSID set.
12. The method of clause 11, where the first beacon frame includes a respective transmitter address indicating a transmitted BSSID of the first multiple BSSID set and the second beacon frame includes a respective transmitter address indicating a transmitted BSSID of the second multiple BSSID set.
13. The method of any of clauses 11 or 12, where each of the first and second beacon frames includes a respective multiple BSSID configuration element having a full set receive periodicity (FSRP) field that is set to a value equal to 1.
14. The method of any of clauses 11 or 12, where the first beacon frame includes a respective multiple BSSID configuration element having an FSRP field that is set to a first value and the second beacon frame includes a respective multiple BSSID configuration element having an FSRP field that is set to a second value.
15. The method of any of clauses 11-14, where BSSIDs in the first multiple BSSID set span a first range of values in an ordered sequence of values and BSSIDs in the second multiple BSSID set span a second range of values in the ordered sequence that does not overlap the first range.
16. The method of any of clauses 11-15, where the first beacon frame includes one or more multiple BSSID elements each having a respective maximum BSSID indicator field that is set to a value (n), where the first 48-n bits of each BSSID in the first multiple BSSID set are the same as the first 48-n bits of each BSSID in the second multiple BSSID set.
17. The method of any of clauses 11-16, where each of the first and second multiple BSSID elements includes a respective maximum BSSID indicator field that is set to a value (n) based on a number (N) of BSSIDs in the first multiple BSSID set and a number (M) of BSSIDs in the second multiple BSSID set.
18. The method of any of clauses 11-17, where wherein $2^n \geq N+M$.
19. The method of any of clauses 11-18, further including:
broadcasting a third beacon frame that carries the BSSID information associated with the one or more nontransmitted BSSIDs of the first multiple BSSID set, the third beacon frame being broadcast one beacon interval after the first beacon frame; and
broadcasting a fourth beacon frame that carries the BSSID information associated with the one or more nontransmitted BSSIDs of the second multiple BSSID set, the fourth beacon frame being broadcast one beacon interval after the second beacon frame.
20. The method of any of clauses 11-19, further including:
broadcasting a third beacon frame that carries BSSID information associated with one or more nontransmitted BSSIDs of the first multiple BSSID set that are different than the nontransmitted BSSIDs associated with the BSSID information carried in the first beacon frame, the third beacon frame being broadcast less than a beacon interval after the first beacon frame.
21. The method of any of clauses 11-20, where the first and third beacon frames are broadcast as a burst transmission.
22. The method of any of clauses 11-21, further including:
broadcasting a fourth beacon frame that carries BSSID information associated with one or more nontransmitted BSSIDs of the second multiple BSSID set that are different than the nontransmitted BSSIDs associated with the BSSID information carried in the second beacon frame, the fourth beacon frame being broadcast less than a beacon interval after the second beacon frame.
23. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 11-22.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method for wireless communication by a wireless communication device, comprising:
broadcasting, on a first channel via a first access point (AP) of the wireless communication device, a first beacon frame that carries basic service set (BSS) identifier (BSSID) information associated with a first plurality of nontransmitted BSSIDs of a first multiple

BSSID set, wherein the first AP corresponds to a first transmitted BSSID of the first multiple BSSID set; and broadcasting, on the first channel via a second AP of the wireless communication device, a second beacon frame that carries BSSID information associated with a second plurality of nontransmitted BSSIDs of a second multiple BSSID set that is different than the first multiple BSSID set, wherein the second AP corresponds to a second transmitted BSSID of the second multiple BSSID set.

2. The method of claim 1, wherein the first beacon frame includes a first transmitter address indicating the first transmitted BSSID of the first multiple BSSID set and the second beacon frame includes a second transmitter address indicating the second transmitted BSSID of the second multiple BSSID set.

3. The method of claim 1, wherein each of the first beacon frame and the second beacon frame includes a respective multiple BSSID configuration element having a full set receive periodicity field that is set to a value equal to 1.

4. The method of claim 1, wherein the first beacon frame includes a first multiple BSSID configuration element having a first full set receive periodicity field that is set to a first value and the second beacon frame includes a second multiple BSSID configuration element having a second full set receive periodicity field that is set to a second value.

5. The method of claim 1, wherein BSSIDs in the first multiple BSSID set span a first range of values in an ordered sequence of values and BSSIDs in the second multiple BSSID set span a second range of values in the ordered sequence of values, wherein the second range of values does not overlap with the first range of values.

6. The method of claim 1, wherein the first multiple BSSID set and the second multiple BSSID set include respective maximum BSSID indicator fields that are set to a value (n) and a value (m), respectively, wherein n is based on a number (N) of BSSIDs in the first multiple BSSID set and m is based on a number (M) of BSSIDs in the second multiple BSSID set.

7. The method of claim 6, wherein $2^n \geq N+M$.

8. The method of claim 6, wherein $2^n \geq N$ and $2^m \geq M$, wherein n and m are the same or are different, and wherein N and M are the same or are different.

9. The method of claim 1, further comprising:

broadcasting, on the first channel, a third beacon frame that carries the BSSID information associated with the first plurality of nontransmitted BSSIDs of the first multiple BSSID set, the third beacon frame being broadcast one beacon interval after the first beacon frame; and broadcasting, on the first channel, a fourth beacon frame that carries the BSSID information associated with the second plurality of nontransmitted BSSIDs of the second multiple BSSID set, the fourth beacon frame being broadcast one beacon interval after the second beacon frame.

10. The method of claim 1, further comprising:

broadcasting, on the first channel, a third beacon frame that carries BSSID information associated with one or more nontransmitted BSSIDs of the first multiple BSSID set that are different than the first plurality of nontransmitted BSSIDs associated with the BSSID information carried in the first beacon frame, the third beacon frame being broadcast less than a beacon interval after the first beacon frame.

11. The method of claim 10, wherein the first beacon frame and the third beacon frame are broadcast as a burst transmission.

12. The method of claim 10, further comprising:

broadcasting, on the first channel, a fourth beacon frame that carries BSSID information associated with one or more nontransmitted BSSIDs of the second multiple BSSID set that are different than the second plurality of nontransmitted BSSIDs associated with the BSSID information carried in the second beacon frame, the fourth beacon frame being broadcast less than a beacon interval after the second beacon frame.

13. The method of claim 1, wherein the first beacon frame is broadcast at a first time within a beacon interval and the second beacon frame is broadcast at a second time within the beacon interval, and wherein the beacon interval is associated with the first transmitted BSSID of the first multiple BSSID set.

14. The method of claim 1, wherein first BSSIDs of the first multiple BSSID set are uncorrelated with second BSSIDs of the second multiple BSSID set.

15. The method of claim 1, wherein first BSSIDs of the first multiple BSSID set are correlated with second BSSIDs of the second multiple BSSID set, and wherein the first multiple BSSID set and the second multiple BSSID set are associated with a same BSS color.

16. A wireless communication device comprising:

one or more processors; and one or more memories coupled with the one or more processors and that store processor-executable code that, when executed by the one or more processors, is configured to cause the wireless communication device to:

broadcast, on a first channel via a first access point (AP) of the wireless communication device, a first beacon frame that carries basic service set identifier (BSSID) information associated with a first plurality of nontransmitted BSSIDs of a first multiple BSSID set, wherein the first AP corresponds to a first transmitted BSSID of the first multiple BSSID set; and broadcast, on the first channel via a second AP of the wireless communication device, a second beacon frame that carries BSSID information associated with a second plurality of nontransmitted BSSIDs of a second multiple BSSID set that is different than the first multiple BSSID set, wherein the second AP corresponds to a second transmitted BSSID of the second multiple BSSID set.

17. The wireless communication device of claim 16, wherein each of the first beacon frame and the second beacon frame includes a respective multiple BSSID configuration element having a full set receive periodicity field that is set to a value equal to 1.

18. The wireless communication device of claim 16, wherein BSSIDs in the first multiple BSSID set span a first range of values in an ordered sequence of values and BSSIDs in the second multiple BSSID set span a second range of values in the ordered sequence of values that does not overlap with the first range of values.

19. The wireless communication device of claim 16, wherein the first multiple BSSID set and the second multiple BSSID set include respective maximum BSSID indicator fields that are set to a value (n) and a value (m), respectively, wherein n is based on a number (N) of BSSIDs in the first multiple BSSID set and m is based on a number (M) of BSSIDs in the second multiple BSSID set, wherein $2^n \geq N$ and $2^m \geq M$, wherein n and m are the same or are different, and wherein N and M are the same or are different.

20. The wireless communication device of claim 19, wherein $2^n \geq N+M$.

21. The wireless communication device of claim 16, wherein the processor-executable code, when executed by the one or more processors, is further configured to cause the wireless communication device to:
broadcast, on the first channel, a third beacon frame that carries the BSSID information associated with the first plurality of nontransmitted BSSIDs of the first multiple BSSID set, the third beacon frame being broadcast one beacon interval after the first beacon frame; and
broadcast, on the first channel, a fourth beacon frame that carries the BSSID information associated with the second plurality of nontransmitted BSSIDs of the second multiple BSSID set, the fourth beacon frame being broadcast one beacon interval after the second beacon frame.

22. The wireless communication device of claim 16, wherein the first beacon frame is broadcast at a first time within a beacon interval and the second beacon frame is broadcast at a second time within the beacon interval, and wherein the beacon interval is associated with the first transmitted BSSID of the first multiple BSSID set.

23. The wireless communication device of claim 16, wherein first BSSIDs of the first multiple BSSID set are uncorrelated with second BSSIDs of the second multiple BSSID set.

24. The wireless communication device of claim 16, wherein first BSSIDs of the first multiple BSSID set are correlated with second BSSIDs of the second multiple BSSID set, and wherein the first multiple BSSID set and the second multiple BSSID set are associated with a same BSS color.

25. A method for wireless communication by a wireless communication device, comprising:
broadcasting, on a first channel at a first time, a first beacon frame that carries basic service set identifier (BSSID) information associated with one or more first nontransmitted BSSIDs of a multiple BSSID set and, on the first channel at a second time, a second beacon frame that carries BSSID information associated with one or more second nontransmitted BSSIDs of the multiple BSSID set that are different than the one or more first nontransmitted BSSIDs; and
broadcasting, on the first channel a first time interval after the first beacon frame, a third beacon frame that carries the BSSID information associated with the one or more first nontransmitted BSSIDs of the multiple BSSID set and, on the first channel a second time interval after the second beacon frame, a fourth beacon frame that carries the BSSID information associated with the one or more second nontransmitted BSSIDs of the multiple BSSID set that are different than the one or more first nontransmitted BSSIDs.

26. The method of claim 25, wherein the first beacon frame and the second beacon frame are broadcast as a burst transmission within a first beacon interval, and wherein the first time interval and the second time interval each comprise one beacon interval.

27. The method of claim 25, wherein the first beacon frame includes a respective transmitter address indicating a transmitted BSSID of the multiple BSSID set, the second beacon frame includes a respective transmitter address indicating the transmitted BSSID of the multiple BSSID set, the third beacon frame includes a respective transmitter address indicating the transmitted BSSID of the multiple BSSID set, and the fourth beacon frame includes a respective transmitter address indicating the transmitted BSSID of the multiple BSSID set.

28. A wireless communication device comprising:
one or more processors; and
one or more memories coupled with the one or more processors and that store processor-executable code that, when executed by the one or more processors, is configured to cause the wireless communication device to:
broadcast, on a first channel at a first time, a first beacon frame that carries basic service set identifier (BSSID) information associated with one or more first nontransmitted BSSIDs of a multiple BSSID set and, on the first channel at a second time, a second beacon frame that carries BSSID information associated with one or more second nontransmitted BSSIDs of the multiple BSSID set that are different than the one or more first nontransmitted BSSIDs; and
broadcast, on the first channel a first time interval after the first beacon frame, a third beacon frame that carries the BSSID information associated with the one or more first nontransmitted BSSIDs of the multiple BSSID set and, on the first channel a second time interval after the second beacon frame, a fourth beacon frame that carries the BSSID information associated with the one or more second nontransmitted BSSIDs of the multiple BSSID set that are different than the one or more first nontransmitted BSSIDs.

29. The wireless communication device of claim 28, wherein the first beacon frame and the second beacon frame are broadcast as a burst transmission within a first beacon interval, and wherein the first time interval and the second time interval each comprise one beacon interval.

30. The wireless communication device of claim 28, wherein each of the first beacon frame, the second beacon frame, the third beacon frame, and the fourth beacon frame includes a respective multiple BSSID configuration element having a respective full set receive periodicity field that is set to a value greater than 1, a first full set receive periodicity field of the first beacon frame being set to a same value as a second full set receive periodicity field of the second beacon frame.

* * * * *